United States Patent (12)
Bang et al.

(10) Patent No.: US 12,107,724 B2
(45) Date of Patent: Oct. 1, 2024

(54) ELECTRONIC DEVICE FOR MANAGING NETWORK CONFIGURATION INFORMATION AND OPERATING METHOD THEREOF

(71) Applicant: SAMSUNG ELECTRONICS CO., LTD., Suwon-si (KR)

(72) Inventors: Hyejung Bang, Suwon-si (KR); Buseop Jung, Suwon-si (KR); Sunkey Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/730,630

(22) Filed: Apr. 27, 2022

(65) Prior Publication Data

US 2022/0353135 A1 Nov. 3, 2022

Related U.S. Application Data

(63) Continuation of application No. PCT/KR2022/005658, filed on Apr. 20, 2022.

(30) Foreign Application Priority Data

Apr. 28, 2021 (KR) ........................ 10-2021-0055141

(51) Int. Cl.
*H04L 41/082* (2022.01)
*H04L 41/08* (2022.01)
(Continued)

(52) U.S. Cl.
CPC ........ *H04L 41/082* (2013.01); *H04L 41/0836* (2013.01); *H04L 41/0843* (2013.01); *H04L 41/0886* (2013.01)

(58) Field of Classification Search
CPC ............... H04L 41/082; H04L 41/0806; H04L 41/0836; H04L 41/0843; H04L 41/0886
See application file for complete search history.

(56) References Cited

U.S. PATENT DOCUMENTS 11,343,676 B1* 5/2022 Zhang ................. H04L 41/0806
2014/0366105 A1 12/2014 Bradley et al.
(Continued)

FOREIGN PATENT DOCUMENTS

JP 2020-043474 A 3/2020
JP 2020-088620 A 6/2020
(Continued)

OTHER PUBLICATIONS

Search Report and Written Opinion issued Jul. 15, 2022 in counterpart International Patent Application No. PCT/KR2022/005658.
(Continued)

*Primary Examiner* — Nam T Tran
(74) *Attorney, Agent, or Firm* — NIXON & VANDERHYE P.C.

(57) ABSTRACT

According to various embodiments, an electronic device may comprise: at least one communication circuit, and at least one processor, and the at least one processor may be configured to: receive, from an external electronic device through the at least one communication circuit, a message requesting network configuration information including network role information set to a configurator, transmit, to the external electronic device through the at least one communication circuit, a message including network configuration information of the electronic device, update the network configuration information, transmit, to the external electronic device through the at least one communication circuit, a message indicating that the network configuration information is updated, and transmit, to the external electronic device through the at least one communication circuit, a (Continued)

message including updated network configuration information.

18 Claims, 15 Drawing Sheets

(51) Int. Cl.
*H04L 41/0823* (2022.01)
*H04L 41/084* (2022.01)

(56) References Cited

U.S. PATENT DOCUMENTS

| | | | |
|---|---|---|---|
| 2016/0360407 A1* | 12/2016 | Benoit | H04W 12/06 |
| 2017/0257819 A1* | 9/2017 | McCann | H04W 12/04 |
| 2017/0295448 A1* | 10/2017 | McCann | H04L 63/08 |
| 2018/0109381 A1 | 4/2018 | Cammarota et al. | |
| 2019/0123964 A1 | 4/2019 | Lepp et al. | |
| 2019/0306710 A1 | 10/2019 | Cammarota et al. | |
| 2019/0320407 A1* | 10/2019 | Goyal | H04L 41/0806 |
| 2020/0146101 A1 | 5/2020 | Tsuboi | |
| 2020/0169461 A1* | 5/2020 | Stationwala | H04L 41/0806 |
| 2020/0221296 A1* | 7/2020 | Jiang | H04L 41/0806 |
| 2021/0084469 A1 | 3/2021 | McCann et al. | |
| 2021/0195410 A1 | 6/2021 | Goto | |
| 2021/0282011 A1 | 9/2021 | Tachibana | |

FOREIGN PATENT DOCUMENTS

| | | |
|---|---|---|
| KR | 10-2019-0068549 A | 6/2019 |
| WO | 2019/177231 | 9/2019 |
| WO | 2020/092971 | 5/2020 |

OTHER PUBLICATIONS

Wi-Fi Alliance, 'Wi-Fi Easy Connect Specification Version 2.0', Dec. 14, 2020 [retrieved on Jul. 7, 2022], Retrieved from <https://www.wi-fi.org/download.php?file=/sites/default/files/private/Wi-Fi_Easy_Connect_Specification_v2.0.pdf> section 1.5.3, 6.4.2-6.4.3, 9.8; and figure 2.

Extended European Search Report for EP Application No. 22796036.6 dated Jul. 17, 2024, 12 pages.

Anonymous, Wi-Fi Aware ™ Specification), Device Report Version 3.2, Oct. 23, 2020, 214 pages.

* cited by examiner

ELECTRONIC DEVICE FOR MANAGING NETWORK CONFIGURATION INFORMATION AND OPERATING METHOD THEREOF

CROSS-REFERENCE TO RELATED APPLICATIONS

This application is a continuation of International application No. PCT/KR2022/005658 designating the United States, filed on Apr. 20, 2022, in the Korean Intellectual Property Receiving Office and claiming priority to Korean Patent Application No. 10-2021-0055141, filed on Apr. 28, 2021 in the Korean Intellectual Property Office, the disclosures of each of which are incorporated by reference herein in their entireties.

BACKGROUND

Field

The disclosure relates to an electronic device for managing network configuration information and an operating method thereof.

Description of Related Art

A wireless communication system is being developed widely in order to provide various types of communication services such as voice or data. Generally, the wireless communication system is a multiple access system which is capable of supporting a communication with a plurality of electronic devices by sharing available system resources (e.g., a frequency resource, a bandwidth resource, or an output power resource). Multiple access systems may include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Various wireless communication technologies are being developed along with the development of an information communication technology. For example, a wireless local area network (WLAN) technology is technology which may allow an access to Internet in a wireless manner at a home, an office, or a specific service provision area using an electronic device such as a smart phone, a personal digital assistant (PDA), or a laptop computer based on a wireless frequency technology.

In order to secure flexibility of a communication between devices in a WLAN system, various protocols have been proposed for a direct communication between devices without intervention of a management entity such as a base station (BS) or an access point (AP). For example, Wi-Fi alliance (WFA) which is based on a Wi-Fi standard has developed a device provisioning protocol (DPP) capable of simply and efficiently connecting a Wi-Fi device which does not have a user interface (UI) or has a limited UI to a Wi-Fi network.

In a DPP technology which has been standardized by WFA based on a Wi-Fi standard, a plurality of configurators may be used for provisioning. If it is required that the plurality of configurators are used, a configurator, e.g., an existing configurator, which has already been activated needs to perform a configurator delegation operation for delegating authority to a new configurator to share network management and provide a backup for a configurator function.

However, a current DPP technology specifies that the plurality of configurators may be used, and the existing configurator performs the configurator delegation operation for the new configurator, but the current DPP technology does not specify how the plurality of configurators are configured in detail.

Further, the current DPP technology specifies that the plurality of configurators may be used and that the existing configurator performs the configurator delegation operation for the new configurator, but does not specify how a plurality of configurators share network configuration information in detail.

In addition, the current DPP technology specifies that the plurality of configurators may be used and that the existing configurator performs the configurator delegation operation for the new configurator, but does not specify how the plurality of configurators manage the network configuration information after the configurator delegation operation is performed.

SUMMARY

Various embodiments of the disclosure may provide an electronic device for managing network configuration information and an operating method thereof.

Various embodiments of the disclosure may provide an electronic device for updating network configuration information and an operating method thereof.

Various embodiments of the disclosure may provide an electronic device for synchronizing network configuration information among a plurality of configurators in a DPP network and an operating method thereof.

Various embodiments of the disclosure may provide an electronic device for configuring a plurality of configurators and synchronizing network configuration information among the plurality of configurators in a DPP network, and an operating method thereof.

According to various example embodiments, an electronic device comprises: at least one communication circuit, and at least one processor, and the at least one processor is configured to: receive, from an external electronic device through the at least one communication circuit, a message requesting network configuration information including network role information set to a configurator, transmit, to the external electronic device through the at least one communication circuit, a message including network configuration information of the electronic device, update the network configuration information, transmit, to the external electronic device through the at least one communication circuit, a message indicating that the network configuration information is updated, and transmit, to the external electronic device through the at least one communication circuit, a message including updated network configuration information.

According to various example embodiments, an electronic device comprises: at least one communication circuit, and at least one processor, and the at least one processor is configured to: transmit, to an external electronic device through the at least one communication circuit, a message requesting network configuration information and including network role information set to a configurator, receive, from the external electronic device through the at least one communication circuit, a message including network configuration information of the external electronic device, receive, from the external electronic device through the at least one communication circuit, a message indicating that the network configuration information is updated, and receive, from the external electronic device through the at least one communication circuit, a message including updated network configuration information.

According to various example embodiments, a method for managing network configuration information in an electronic device comprises: receiving, from an external electronic device, a message requesting network configuration information including network role information set to a configurator, transmitting, to the external electronic device, a message including network configuration information of the electronic device, updating the network configuration information, transmitting, to the external electronic device, a message indicating that the network configuration information is updated, and transmitting, to the external electronic device, a message including the updated network configuration information.

According to various example embodiments, a method for managing network configuration information in an electronic device comprises: transmitting, to an external electronic device, a message requesting network configuration information including network role information set to a configurator, receiving, from the external electronic device, a message including network configuration information of the external electronic device, receiving, from the external electronic device, a message indicating that the network configuration information is updated, and receiving, from the external electronic device, a message including updated network configuration information.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
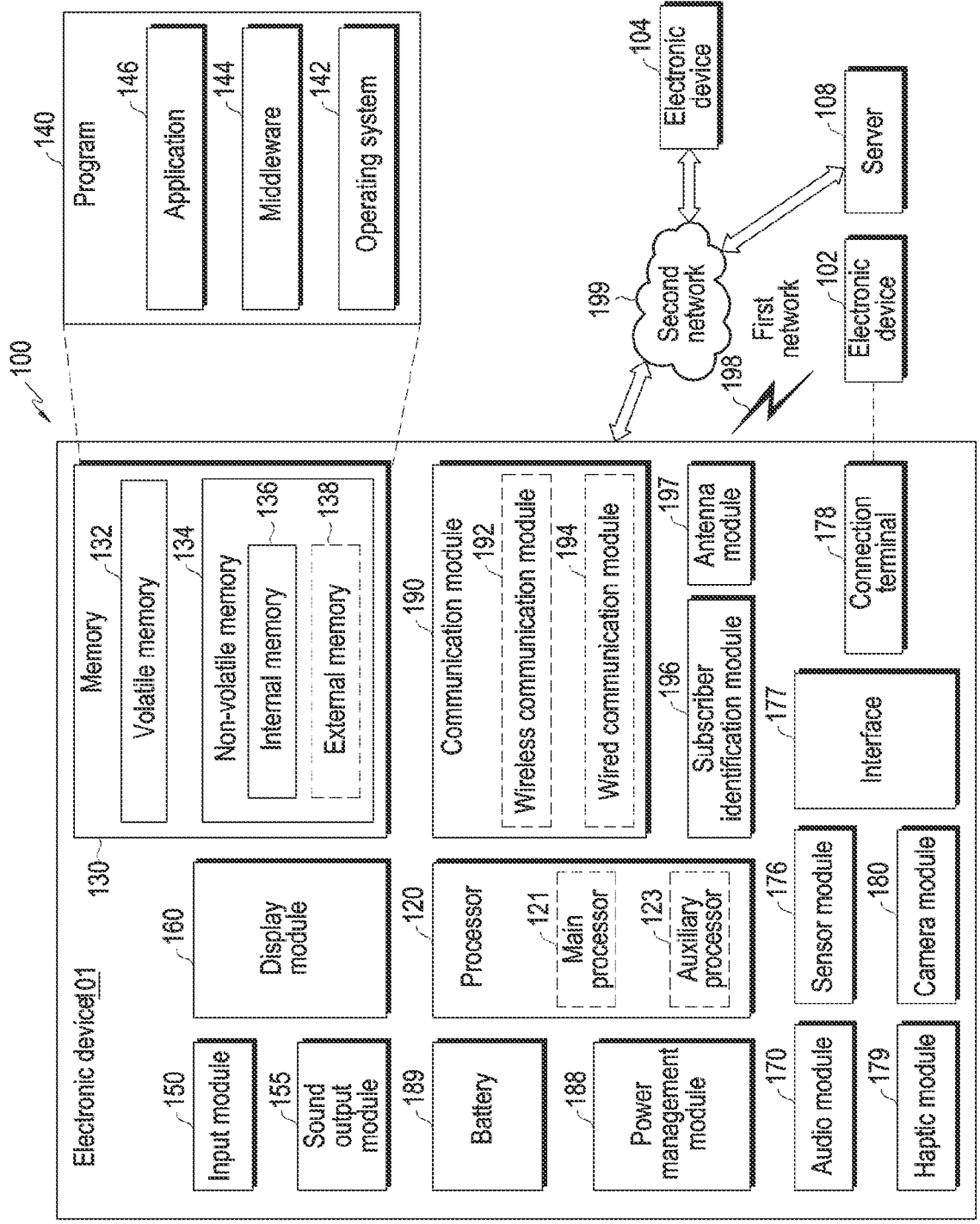
FIG. 1 is a block diagram illustrating an example electronic device within a network environment according to various embodiments.

Hereinafter, various example embodiments of the disclosure will be described in greater detail with reference to the accompanying drawings. In the following description of various example embodiments of the disclosure, a detailed description of relevant known functions or configurations incorporated herein may be omitted when it is determined that the description may make obscure the subject matter of various embodiments of the disclosure with unnecessary detail. The terms which will be described below are terms defined in consideration of the functions in the disclosure, and may be different according to users, intentions of the users, or customs. Therefore, the definitions of the terms should be made based on the contents throughout the disclosure.

It should be noted that the technical terms used herein are used to describe specific embodiments, and are not intended to limit the disclosure. The technical terms used herein should be interpreted to have the same meaning as those commonly understood by a person skilled in the art to which the disclosure pertains, and should not be interpreted have excessively comprehensive or excessively restricted meanings unless particularly defined as other meanings. When the technical terms used herein are wrong technical terms that cannot correctly represent the idea of the disclosure, it should be appreciated that they are replaced by technical terms correctly understood by those skilled in the art. The general terms used herein should be interpreted as defined in dictionaries or interpreted in the context of the relevant part, and should not be interpreted to have excessively restricted meanings.

A singular expression used herein may include a plural expression unless they are definitely different in the context. As used herein, such an expression as "comprises" or "include", or the like should not be interpreted to necessarily include all elements or all operations described in the disclosure, and should be interpreted to be allowed to exclude some of them or further include additional elements or operations.

The terms including an ordinal number, such as expressions "a first" and "a second" may be used to describe various elements, but the corresponding elements should not be limited by such terms. These terms are used merely to distinguish between one element and any other element. For example, a first element may be termed a second element, and similarly, a second element may be termed a first element without departing from the scope of the disclosure.

It should be understood that when an element is referred to as being "connected" or "coupled" to another element, it may be connected or coupled directly to the other element, or any other element may be interposed between them. It should be understood that when an element is referred to as being "directly connected" or "directly coupled" to another element, there are no element(s) interposed between them.

Hereinafter, various example embodiments of the disclosure will be described in greater detail with reference to the accompanying drawings. Regardless of drawing signs, the same or like elements are provided with the same reference numeral, and a repeated description thereof may not be repeated. In describing various embodiments of the disclosure, a detailed description of relevant known technologies may be omitted when it is determined that the description may make the subject matter of the disclosure unclear. It should be noted that the accompanying drawings are presented merely to aid in understanding of the technical idea of the disclosure, and should not be construed to limit the technical idea of the disclosure. The technical idea of the disclosure should be construed to cover all changes, equivalents, and alternatives, in addition to the drawings.

Hereinafter, a terminal will be described in various example embodiments of the disclosure, but the terminal may be referred to, for example, as an electronic device, a mobile station, a mobile equipment (ME), a user equipment (UE), a user terminal (UT), a subscriber station (SS), a wireless device, a handheld device, an access terminal (AT), or the like. In various example embodiments of the disclosure, the terminal may be a device having a communication function such as, for example, a mobile phone, a personal digital assistant (PDA), a smart phone, a wireless MODEM, a notebook, or the like.

In a detailed description of various embodiments of the disclosure, standards provided by institute of electrical and electronics engineers (IEEE) which is a wireless access standardization organization and Wi-Fi alliance (WFA) are referred to, but the disclosure can be somewhat modified and applied to other communication systems having a similar technical background without departing from the scope of the disclosure, and the modifications can be made on the basis of determination of those skilled in the art.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

WFA has proposed a device provisioning protocol (DPP) based on a Wi-Fi technology, and the DPP is a protocol capable of simply and efficiently connecting a Wi-Fi device which does not have a user interface (UI) or has a limited UI to a Wi-Fi network.

Figure 2:
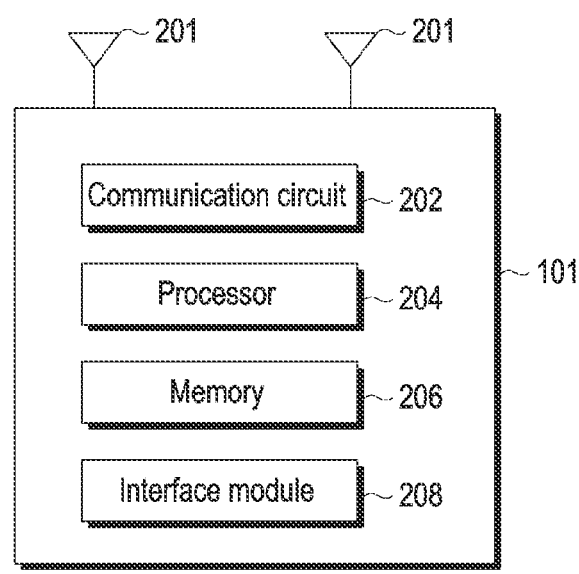
FIG. 2 is a block diagram illustrating an example configuration of an electronic device according to various embodiments.

FIG. 2 is a block diagram illustrating an example configuration of an electronic device 101 according to various embodiments.

Referring to FIG. 2, an electronic device (e.g., an electronic device 101 in FIG. 1) may be a device implementing a DPP. Hereinafter, for convenience of a description, the device implementing the DPP will be referred to as a DPP device.

The electronic device 101 may include a communication circuit 202 (e.g., a communication module 190 in FIG. 1) which transmits and receives signals with an external electronic device (e.g., an electronic device 102 or 104 in FIG. 1), for example, a peer device using one or more antennas 201.

The electronic device 101 may include a processor (e.g., including processing circuitry) 204 (e.g., a processor 120 in FIG. 1) which may be implemented in one or more single-core processors or one or more multi-core processors, and a memory 206 (e.g., a memory 130 in FIG. 1) which stores instructions for an operation of the electronic device 101.

The electronic device 101 may include an interface module (e.g., including interface circuitry) 208 (e.g., an interface 177 in FIG. 1) which provides a wired and/or wireless interface for communicating with components outside a network. At least a portion of the one or more antennas 201, the communication circuit 202, or the interface module 208 may be implemented as, for example, at least a portion of the communication module 190 and the antenna module 198 in FIG. 1.

According to an embodiment, the electronic device 101 may include a plurality of communication circuits, one of the plurality of communication circuits may be a communication circuit which is based on a Wi-Fi technology, and another of the plurality of communication circuits may be a communication circuit which is based on a Bluetooth technology, e.g., a Bluetooth low energy (BLE) technology. According to an embodiment, the plurality of communication circuits may include a communication circuit 202, and the communication circuit 202 may include a communication circuit which is based on the Wi-Fi technology or a communication circuit which is based on the BLE technology.

According to an embodiment, the electronic device 101 does not separately include a communication circuit which is based on the Wi-Fi technology and a communication circuit which is based on the BLE technology, and may include one communication circuit capable of supporting both the Wi-Fi technology and the BLE technology. According to an embodiment, the one communication circuit capable of supporting both the Wi-Fi technology and the BLE technology may be the communication circuit 202.

According to various example embodiments of the disclosure, an electronic device (an electronic device 101 in FIG. 1 or a first electronic device 1010 in FIG. 10) may comprise at least one communication circuit and at least one processor. The at least one processor 204 may be configured to: receive, from an external electronic device (an electronic device 102 or an electronic device 104 in FIG. 1 or a second electronic device 1000 in FIG. 10) through the at least one communication circuit, a message requesting network configuration information including network role information set to a configurator, transmit, to the external electronic device (the electronic device 102 or the electronic device 104 in FIG. 1 or the second electronic device 1000 in FIG. 10) through the at least one communication circuit, a message including network configuration information of the electronic device (the electronic device 101 in FIG. 1 or the first electronic device 1010 in FIG. 10), update the network configuration information, transmit, to the external electronic device (the electronic device 102 or the electronic device 104 in FIG. 1 or the second electronic device 1000 in FIG. 10) through the at least one communication circuit, a message indicating that the network configuration information is updated, and transmit, to the external electronic device (the electronic device 102 or the electronic device 104 in FIG. 1 or the second electronic device 1000 in FIG. 10) through the at least one communication circuit, a message including updated network configuration information.

Figure 10:
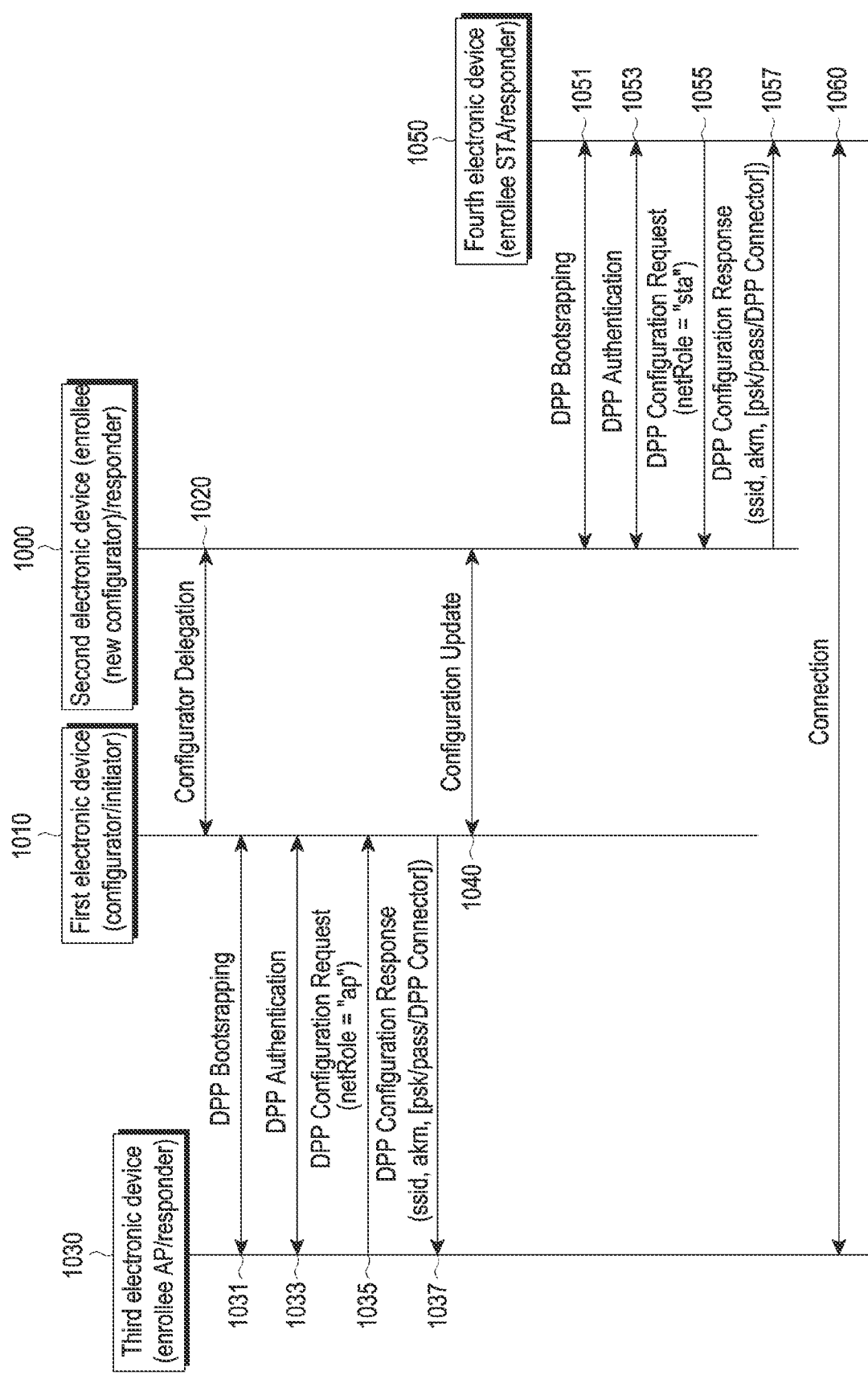
FIG. 10 is a signal flow diagram illustrating an example operation of managing network configuration information in a DPP network according to various embodiments.

According to various example embodiments of the disclosure, the at least one processor may be configured to: transmit, to the external electronic device (the electronic device 102 or the electronic device 104 in FIG. 1 or the second electronic device 1000 in FIG. 10) through the at least one communication circuit, the message indicating that the network configuration information is updated in a discovery window (DW) synchronized between the electronic device (the electronic device 101 in FIG. 1 or the first electronic device 1010 in FIG. 10) and the external electronic device (the electronic device 102 or the electronic device 104 in FIG. 1 or the second electronic device 1000 in FIG. 10).

According to various example embodiments of the disclosure, the message indicating that the network configuration information is updated may include update indication information indicating that the network configuration information is updated, and the message indicating that the network configuration information is updated may include a neighbor awareness networking (NAN) beacon frame or a NAN service discovery frame (SDF).

According to various example embodiments of the disclosure, the update indication information may include at least one of an update field indicating whether the network configuration information is updated, a service set identifier (SSID) field indicating an SSID of a new configuration, or a version field indicating a version of the updated network configuration information.

According to various example embodiments of the disclosure, the message indicating that the network configuration information is updated may include update indication information indicating that the network configuration information is updated, and the message indicating that the network configuration information is updated may include a BLE advertisement (ADV) frame.

According to various example embodiments of the disclosure, the update indication information may include at least one of an update field indicating whether the network configuration information is updated, a service set identifier (SSID) field indicating an SSID of a new configuration, or a version field indicating a version of the updated network configuration information.

According to various example embodiments of the disclosure, the at least one processor may be configured to: perform, through the at least one communication circuit, an authentication operation between the electronic device (the electronic device 101 in FIG. 1 or the first electronic device 1010 in FIG. 10) and the external electronic device (the electronic device 102 or the electronic device 104 in FIG. 1 or the second electronic device 1000 in FIG. 10) after transmitting the message indicating that the network configuration information is updated, receive, from the external electronic device (the electronic device 102 or the electronic device 104 in FIG. 1 or the second electronic device 1000 in FIG. 10) through the at least one communication circuit, the message requesting the network configuration information after performing the authentication operation between the electronic device (the electronic device 101 in FIG. 1 or the first electronic device 1010 in FIG. 10) and the external electronic device (the electronic device 102 or the electronic device 104 in FIG. 1 or the second electronic device 1000 in FIG. 10), and transmit, to the external electronic device (the electronic device 102 or the electronic device 104 in FIG. 1 or the second electronic device 1000 in FIG. 10) through the at least one communication circuit, the message including the updated network configuration information.

According to various example embodiments of the disclosure, the at least one processor may be configured to: set up, through the at least one communication circuit, a neighbor awareness networking (NAN) data path between the electronic device (the electronic device 101 in FIG. 1 or the first electronic device 1010 in FIG. 10) and the external electronic device (the electronic device 102 or the electronic device 104 in FIG. 1 or the second electronic device 1000 in FIG. 10) after transmitting the message indicating that the network configuration information is updated, and transmit, to the external electronic device (the electronic device 102 or the electronic device 104 in FIG. 1 or the second electronic device 1000 in FIG. 10) through the at least one communication circuit, the message including the updated network configuration information through the set up NAN data path.

According to various example embodiments of the disclosure, an electronic device (an electronic device 101 in FIG. 1 or a second electronic device 1000 in FIG. 10) may comprise at least one communication circuit and at least one processor. The at least one processor may be configured to: transmit, to an external electronic device (an electronic device 102 or an electronic device 104 in FIG. 1 or a first electronic device 1010 in FIG. 10) through the at least one communication circuit, a message requesting network configuration information including network role information set to a configurator, receive, from the external electronic device (the electronic device 102 or the electronic device 104 in FIG. 1 or the first electronic device 1010 in FIG. 10) through the at least one communication circuit, a message including network configuration information of the external electronic device (the electronic device 102 or the electronic device 104 in FIG. 1 or the first electronic device 1010 in FIG. 10), receive, from the external electronic device (the electronic device 102 or the electronic device 104 in FIG. 1 or the first electronic device 1010 in FIG. 10) through the at least one communication circuit, a message indicating that the network configuration information is updated, and receive, from the external electronic device (the electronic device 102 or the electronic device 104 in FIG. 1 or the first electronic device 1010 in FIG. 10) through the at least one communication circuit, a message including updated network configuration information.

According to various example embodiments of the disclosure, the at least one processor may be configured to: receive, from the external electronic device (the electronic device 102 or the electronic device 104 in FIG. 1 or the first electronic device 1010 in FIG. 10) through the at least one communication circuit, the message indicating that the network configuration information is updated in a discovery window (DW) synchronized between the electronic device (the electronic device 101 in FIG. 1 or the second electronic device 1000 in FIG. 10) and the external electronic device (the electronic device 102 or the electronic device 104 in FIG. 1 or the first electronic device 1010 in FIG. 10).

According to various example embodiments of the disclosure, the message indicating that the network configuration information is updated may include update indication information indicating that the network configuration information is updated, and the message indicating that the network configuration information is updated may include a neighbor awareness networking (NAN) beacon frame or a NAN service discovery frame (SDF).

According to various example embodiments of the disclosure, the update indication information may include at least one of an update field indicating whether the network configuration information is updated, a service set identifier (SSID) field indicating an SSID of a new configuration, or a version field indicating a version of the updated network configuration information.

According to various example embodiments of the disclosure, the message indicating that the network configuration information is updated may include update indication information indicating that the network configuration information is updated, and the message indicating that the network configuration information is updated may include a Bluetooth low energy (BLE) advertisement (ADV) frame.

According to various example embodiments of the disclosure, the update indication information may include at least one of an update field indicating whether the network configuration information is updated, or a version field indicating a version of the updated network configuration information.

According to various example embodiments of the disclosure, the at least one processor may be configured to: perform, through the at least one communication circuit, an authentication operation between the electronic device (the electronic device 101 in FIG. 1 or the second electronic device 1000 in FIG. 10) and the external electronic device (the electronic device 102 or the electronic device 104 in FIG. 1 or the first electronic device 1010 in FIG. 10) after receiving the message indicating that the network configuration information is updated, transmit, to the external electronic device (the electronic device 102 or the electronic device 104 in FIG. 1 or the first electronic device 1010 in FIG. 10) through the at least one communication circuit, the message requesting the network configuration information after performing the authentication operation between the electronic device (the electronic device 101 in FIG. 1 or the second electronic device 1000 in FIG. 10) and the external electronic device (the electronic device 102 or the electronic device 104 in FIG. 1 or the first electronic device 1010 in FIG. 10), and receive, from the external electronic device (the electronic device 102 or the electronic device 104 in FIG. 1 or the first electronic device 1010 in FIG. 10) through the at least one communication circuit, the message including the updated network configuration information.

According to various example embodiments of the disclosure, the at least one processor may be configured to: set up, through the at least one communication circuit, a neighbor awareness networking (NAN) data path between the electronic device (the electronic device 101 in FIG. 1 or the second electronic device 1000 in FIG. 10) and the external electronic device (the electronic device 102 or the electronic device 104 in FIG. 1 or the first electronic device 1010 in FIG. 10) after receiving the message indicating that the network configuration information is updated, and receive, from the external electronic device (the electronic device 102 or the electronic device 104 in FIG. 1 or the first electronic device 1010 in FIG. 10) through the at least one communication circuit, the message including the updated network configuration information through the set up NAN data path.

In an embodiment, providing a process for easily and securely connecting a Wi-Fi device to a network may be essential for a continued growth and expansion of a Wi-Fi technology. For example, in a market such as a smart home or IoT where there are many Wi-Fi devices which do not have a UI or have a UI but have limitations on the UI, the process for easily and securely connecting the Wi-Fi device to the network may be more essential.

In order to configure a network connection of a Wi-Fi device, network information and a secure credential may need to be provided to the Wi-Fi device. In an embodiment of the disclosure, the secure credential may include information required for joining a peer-to-peer (P2P) group as defined in a Wi-Fi simple configuration specification. An operation of adding a Wi-Fi device which does not have a UI or has a limitation on a UI to a network may be cumbersome, and may be performed in a different way for each manufacturer of the Wi-Fi device.

There is a need for a Wi-Fi device configuration scheme which may easily and efficiently connect a Wi-Fi device to a Wi-Fi network, and for this, WFA has developed a DPP capable of simply and efficiently connecting a Wi-Fi device which does not have a UI or has a limited UI to a Wi-Fi network.

Based on a standardized mechanism, the DPP may simplify a configuration of the Wi-Fi device and directly connect the Wi-Fi device to the Wi-Fi network in a relatively easy way, for example, by scanning a product QR code with a smart phone. In an embodiment, the DPP may provide, for example, an improved user experience, enhanced security, and/or IoT device provisioning support while simplifying network setup and client device provisioning.

According to various embodiments, in the DPP, for example, in a network such as a home or an office, a network manager may set up an access point (AP) using a trusted device such as, for example, a smart phone, and manage network accesses of other client devices, for example, other client Wi-Fi devices. For example, the DPP is a protocol which enables a smooth user experience while maintaining a secure network connection using a robust cryptography principle.

Figure 3:
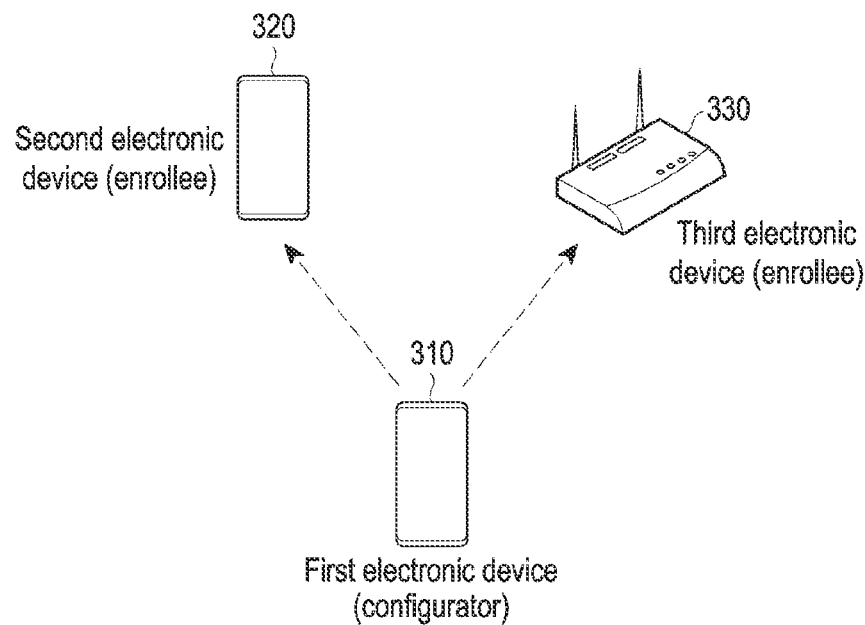
FIG. 3 is a diagram illustrating an example architecture of a device provisioning protocol (DPP) network according to various embodiments.

FIG. 3 is a diagram illustrating an example architecture of a DPP network according to various embodiments.

In an embodiment, an architecture of a DPP network illustrated in FIG. 3 may be an architecture according to a Wi-Fi provisioning role. Referring to FIG. 3, the DPP network may include a plurality of electronic devices, for example, an electronic device (e.g., a first electronic device 310), and external electronic devices (e.g., a second electronic device 320 and a third electronic device 330). In an embodiment, each of the first electronic device 310, the second electronic device 320, and the third electronic device 330 may be a DPP device.

A DPP architecture may define device roles during a DPP bootstrapping operation, a DPP authentication operation, a DPP provisioning (or configuration) operation, and a DPP connectivity (or introduction) operation, and the device roles may include two types, for example, a configurator and an enrollee, or an initiator and a responder. In the example illustrated in FIG. 3, the first electronic device 310 may operate as the configurator, and each of the second electronic device 320 and the third electronic device 330 may operate as the enrollee.

In the DPP network, the configurator may be a logical entity with capabilities to enroll and provision devices for a device-to-device (D2D) communication or an infrastructure communication.

In the DPP network, the initiator may represent a DPP device which initiates a DPP authentication protocol, and one of the configurator or the enrollee may be the initiator. In an embodiment, the responder may represent a DPP device which responds to initiation of the DPP authentication protocol by the initiator, and one of the configurator or the enrollee may be the responder.

The configurator may support setup of the enrollee, and the configurator and the enrollee may be involved in the DPP bootstrapping operation, the DPP authentication operation, and the DPP configuration operation. The configurator or the enrollee may operate as the initiator in the DPP bootstrapping operation and the DPP authentication operation. In contrast, the DPP configuration operation and the DPP introduction operation may only be initiated by the enrollee.

The configurator and the enrollee may possess bootstrapping keys from the same elliptic curve before starting the DPP authentication operation. In an embodiment, the elliptic curve may be an algorithm used for generating cryptographic keys. In an embodiment, if necessary (and depending on a bootstrapping method), bootstrapping keys may be generated upon request. The DPP authentication operation may require the initiator to obtain a bootstrapping key of the responder as part of a previous bootstrapping mechanism. Optionally, in the DPP authentication operation, the configurator and the enrollee may obtain each other's bootstrapping keys in order to provide mutual authentication.

After authentication is completed, the configurator may provision the enrollee for a D2D communication or an infrastructure communication. As part of this provisioning, the configurator may enable the enrollee to establish secure associations with other peers, for example, other external electronic devices in the DPP network.

In an embodiment of the disclosure, a detailed description of an example configurator and an example enrollee may be as follows.

In a DPP network, a specific DPP device, for example, a main DPP device may be designated as the configurator. The configurator as a central configuration point may provision all DPP devices included in the DPP network including an AP. One of various DPP devices included in the DPP network may be the configurator.

In an embodiment, the enrollee is a DPP device which a network manager of a DPP network wishes to connect to the DPP network. A DPP device which is added to the DPP network, for example, an AP, a smart home appliance, a computer, a printer, or a TV may be the enrollee, and all DPP devices capable of implementing a Wi-Fi function, except for a configurator, may be the enrollee.

Figure 4:
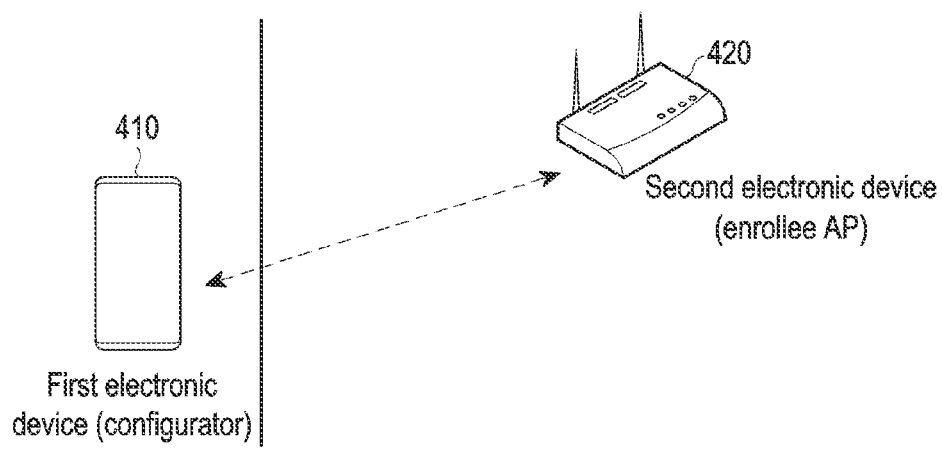
FIG. 4 is a diagram illustrating an example network configuration operation in a DPP network according to various embodiments.

FIG. 4 is a diagram illustrating an example network configuration operation in a DPP network according to various embodiments.

Referring to FIG. 4, a DPP network may include a plurality of electronic devices, e.g., an electronic device (e.g., a first electronic device 410) and an external electronic device (e.g., a second electronic device 420). In FIG. 4, each of the first electronic device 410 and the second electronic device 420 may be a DPP device, and it will be assumed that the first electronic device 410 operates as a configurator, and the second electronic device 420 operates as an enrollee AP.

In an embodiment, the first electronic device 410 may provision the second electronic device 420, e.g., an initial AP 420 which is an enrollee based on a DPP. The first electronic device 410 may provision enrollee clients (not shown separately in FIG. 4) which are other enrollees, thereby enabling enrollees to discover and select the DPP network, and connect to the DPP network.

As shown in FIG. 4, in an initial enrollment procedure, a network manager of the DPP network may configure the first electronic device 410, which is a mobile device, as a configurator, and then configure an AP (e.g., enrollee AP), e.g., the second electronic device 420 which is regarded as an enrollee through the first electronic device 410. Such an AP configuration operation may be performed before network connection, and the DPP network may be configured through such an AP configuration operation.

Figure 5:
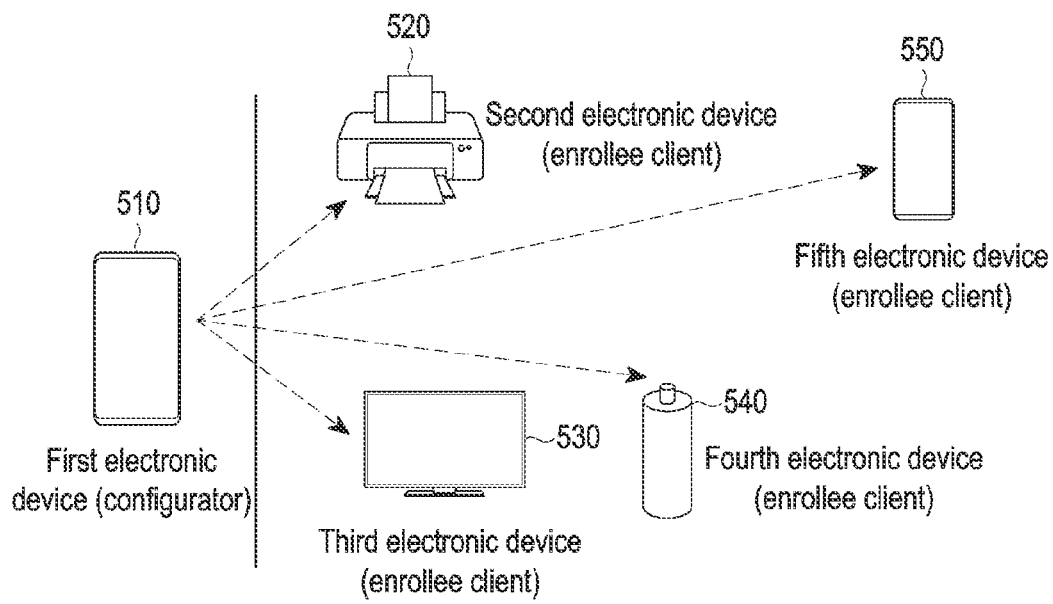
FIG. 5 is a diagram illustrating an example enrollment operation in a DPP network according to various embodiments.

FIG. 5 is a diagram illustrating an example enrollment operation in a DPP network according to various embodiments.

Referring to FIG. 5, after a DPP network is configured, a manager of the DPP network may initiate an enrollment procedure for enrolling DPP devices. In an embodiment, the DPP network may include a plurality of electronic devices, e.g., an electronic device (e.g., a first electronic device 510) and external electronic devices (e.g., a second electronic device 520, a third electronic device 530, a fourth electronic device 540, or a fifth electronic device 550). In FIG. 5, it will be assumed that the first electronic device 510 operates as a configurator, and each of the second electronic device 520, the third electronic device 530, the fourth electronic device 540, and the fifth electronic device 550 operates as an enrollee client.

At least one of the second electronic device 520, the third electronic device 530, the fourth electronic device 540, or the fifth electronic device 550 may obtain configuration for a connection to the DPP network based on information provisioned by the first electronic device 510. Then, the first electronic device 510 may generate a separate secure credential with a corresponding external electronic device, so the corresponding external electronic device may establish a connection to the DPP network. In an embodiment, the security credential may be information required to join a peer-to-peer (P2P) group.

Figure 6:
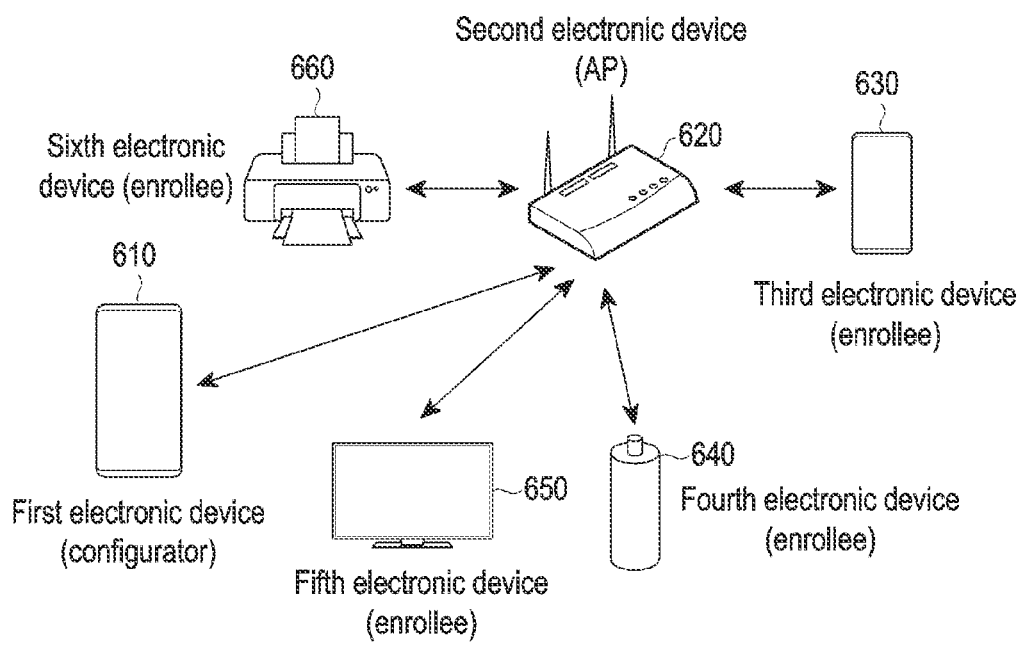
FIG. 6 is a diagram illustrating an example network connection operation in a DPP network according to various embodiments.

FIG. 6 is a diagram illustrating an example network connection operation in a DPP network according to various embodiments.

Referring to FIG. 6, after DPP devices are enrolled in a DPP network, a corresponding enrollee client may discover the DPP network through an AP 620 based on a configuration for a connection to the DPP network obtained in an enrollment procedure, and connect to the discovered DPP network. In an embodiment, the DPP network may include a plurality of electronic devices, e.g., an electronic device (e.g., a first electronic device 610) and external electronic devices (e.g., a second electronic device 620, a third electronic device 630, a fourth electronic device 640, a fifth electronic device 650, and a sixth electronic device 660). In FIG. 6, it will be assumed that the first electronic device 610 operates as a configurator, the second electronic device 620 operates as an AP, and each of the third electronic device 630, the fourth electronic device 640, the fifth electronic device 650, and the sixth electronic device 660 operates as an enrollee.

In an embodiment, the second electronic device 620 which is the AP may be connected to the first electronic device 610 which is the configurator, and at least one of the third electronic device 630, the fourth electronic device 640, the fifth electronic device 650, or the sixth electronic device 660 may discover the DPP network through the second electronic device 620, and connect to the discovered DPP network.

WFA has developed Wi-Fi Easy Connect to make an operation of adding a Wi-Fi device to a Wi-Fi network much simpler and more efficient. The Wi-Fi Easy Connect may support a bootstrapping mechanism, and the bootstrapping mechanism may be a mechanism which may minimize or reduce user's work per Wi-Fi device and add securely a configurator and an enrollee to the Wi-Fi network. The Wi-Fi Easy Connect may use an enrollee QR code to support the bootstrapping mechanism.

In an embodiment, the QR code may include various information such as, for example, a secure key and a unique identifier of a Wi-Fi device. The QR code may be recognized by a Wi-Fi device having a QR code scanning function, and prevent or reduce a hassle of a user having to manually input information for Wi-Fi device authentication. Alternatively, the QR code may also prevent or reduce an issue which may occur due to a data input error.

An example of a provisioning operation using a QR code and a configurator in a Wi-Fi Easy Connect network is described.

(1) A QR code of an enrollee may be scanned using a camera which the configurator has. The QR code may be provided in a form of a sticker or a card.

(2) The configurator may read and decrypt the QR code to automatically discover a secure Wi-Fi communication link with the enrollee, and establish the secure Wi-Fi communication link with the enrollee based on the discovered result.

(3) The configurator may configure Wi-Fi network information to the enrollee using a secure channel.

(4) If configuration of the Wi-Fi network information for the enrollee is completed, the enrollee may use the Wi-Fi network information provided by the configurator to discover a Wi-Fi network without intervention of a user, select a specific Wi-Fi network based on the discovered result, and perform a connection operation to the selected Wi-Fi network.

In an embodiment, in a Wi-Fi Easy Connect network, if a configurator does not have a function capable of recognizing a QR code, or if an enrollee does not have a function of displaying the QR code, it may be possible to establish a Wi-Fi communication link between the configurator and the enrollee by directly inputting a string by a user.

In an embodiment, a Wi-Fi Easy Connect technology may be designed to be flexible to provision Wi-Fi devices in a variety of ways, and may support that a configurator or an enrollee initiates a provisioning operation. As may be seen from an example of the provisioning operation as described above, a Wi-Fi device, for example, a smart phone, which operates as the configurator may scan a QR code of a Wi-Fi device, for example, an IoT device which operates as the enrollee, and include the QR code of the IoT device into Wi-Fi network information to be provisioned.

In an embodiment, the configurator may provide the QR code of the enrollee for Wi-Fi configuration provisioning. For example, in a Wi-Fi network in a hotel, the configurator may provide the enrollee, for example, a hotel room TV with the QR code. A customer may scan the QR code provided through the hotel room TV using a smart phone which will perform a provisioning operation, and accordingly, the provisioning operation may be performed as described above. For example, the smart phone of the customer may be on-board to a Wi-Fi network of the hotel.

In an embodiment, a provisioning process proposed in a DPP may include a total of four operations, e.g., a DPP bootstrapping operation, a DPP authentication operation, a DPP configuration operation, and a DPP access operation. In an embodiment, the DPP access operation may also be referred to as a peer discovery operation. In an embodiment, in three operations up to the DPP bootstrapping operation, the DPP authentication operation, and the DPP configuration operation, one electronic device may operate as a configurator and an external electronic device may operate as an enrollee. In an embodiment, the configurator may perform an operation of configuring electronic devices connected to a DPP network as described above. In an embodiment, an AP which is an enrollee may perform an operation of providing an access to a network as described above. In an embodiment, the enrollee may be an enrollee client or the AP, and if network configuration is completed, the enrollee may be connected to the AP to access the network or may operate as the AP to provide the access to the network.

A DPP bootstrapping operation, a DPP authentication operation, a DPP configuration operation, and an example DPP access operation will be described below.

According to an embodiment, in the DPP bootstrapping operation, DPP devices may exchange public bootstrapping keys to establish a secure provisioning connection. In an embodiment, the public bootstrapping keys may be secure information used in the DPP bootstrapping operation.

For example, an identifier (ID) is assigned to a DPP device, and a QR code or a string (a printed matter or digital) which a user may read may be included in the ID assigned to the DPP device in a form of a public key and a private key. In the DPP bootstrapping operation, a configurator and an enrollee may establish a trusted relationship to perform mutual authentication and establish a secure connection based on a result of the mutual authentication. In an embodiment, as described above, in the DPP bootstrapping operation, public bootstrapping keys are exchanged, and the public bootstrapping keys are transmitted in one way or exchanged bidirectionally depending on whether mutual authentication between the configurator and the enrollee is required. In the DPP bootstrapping operation, for example, the public bootstrapping keys may be exchanged based on, for example, various schemes such as a QR code scheme, a Bluetooth scheme, a Bluetooth low energy (BLE) scheme, a near field communication (NFC) scheme, and a public key exchange (PKEX) scheme, or a cloud scheme.

In an embodiment, after the public bootstrapping keys are exchanged, a connection may be established between the configurator and the enrollee. In an embodiment, the public bootstrapping keys may be different from secure credentials received by the enrollee in a DPP configuration operation after the DPP bootstrapping operation. In an embodiment, bootstrapping information may be used in a DPP authentication operation and the DPP configuration operation after the DPP bootstrapping operation, and may include a small list of global operating class/channel pairs and a medium access control (MAC) address. In an embodiment, the small list of the global operating class/channel pairs may ideally include only one channel.

According to an embodiment, in the DPP authentication operation, DPP devices may establish a reliable and secure channel using bootstrapping keys in a DPP authentication protocol, and in the DPP configuration operation, a configurator may execute a DPP configuration protocol to provision an enrollee via a secure channel established during the DPP authentication operation. This will be described in detail as follows.

According to an embodiment, if a DPP bootstrapping operation is completed, the configurator and the enrollee may establish a secure Wi-Fi connection using the DPP authentication protocol. The configurator which is an initiator in the DPP authentication operation and the DPP configuration operation may request authentication to the enrollee which is a responder based on channel information obtained through the DPP bootstrapping operation. For example, the configurator may request the authentication by transmitting a DPP authentication request frame to the responder. In an embodiment, the DPP authentication request frame may include at least one of a hash for a public bootstrapping key of the responder, a hash for a public bootstrapping key of the initiator, a public protocol key of the initiator, or an initiator nonce attribute and an initiator capabilities attribute which are encrypted with a first intermediate key. In an embodiment, the at least one of the hash for the public bootstrapping key of the responder, the hash for the public bootstrapping key of the initiator, the public protocol key of the initiator, or the initiator nonce attribute and the initiator capabilities attribute which are encrypted with the first intermediate key included in the DPP authentication request frame may be secure information used in the DPP authentication operation.

In an embodiment, the enrollee may respond to an authentication request of the configurator while waiting on a corresponding channel based on the channel information obtained through the DPP bootstrapping operation. For example, the enrollee may respond to the authentication request by transmitting a DPP authentication response frame to the configurator. In an embodiment, the DPP authentication response frame may include at least one of the hash for the public bootstrapping key of the responder, the hash for the public bootstrapping key of the initiator, a public protocol key of the responder, or a responder nonce attribute, a responder capabilities attribute, and an initiator capabilities attribute which are encrypted with a second intermediate key. In an embodiment, the at least one of the hash for the public bootstrapping key of the responder, the hash for the public bootstrapping key of the initiator, the public protocol key of the responder, or the responder nonce attribute, the responder capabilities attribute, and the initiator capabilities attribute which are encrypted with the second intermediate key included in the DPP authentication response frame may be secure information used in the DPP authentication operation.

In an embodiment, as the DPP authentication operation is completed, a secure connection may be established between the configurator and the enrollee, and after the secure connection is established, the enrollee may start transaction for obtaining network configuration information from the configurator. For example, the responder may transmit a DPP configuration request frame to the configurator, and the configurator may transmit, to the responder, a DDP configuration response frame which is a response frame to the DDP configuration request frame. The responder may verify the secure credentials and network information obtained through the DPP configuration protocol, and transmit a result thereof to the configurator. As such a DPP configuration operation is completed, the enrollee may operate as an AP, or may discover a target AP, and be securely connected to the discovered target AP.

In an embodiment, encoded configuration information transmitted and received in a DPP configuration operation may include a DPP configuration object, the DPP configuration object may include the following DPP configuration object parameters, and the DPP configuration object may be a javascript object notation (JSON) encoded data structure. In an embodiment, the DPP configuration object may be referred to as network configuration information.

(1) Wi-Fi Technology Object

A Wi-Fi technology object may identify a Wi-Fi technology of a policy to be provisioned, and the Wi-Fi technology object may indicate a connection type such as an AP infra connection. In an embodiment, an enrollee may set a value of a Wi-Fi technology object included in a DDP configuration request frame to a value indicating a Wi-Fi technology to be provisioned, and a configurator may set a value of a Wi-Fi technology object included in a DPP configuration response frame to a value indicating a Wi-Fi technology which is used in an operation between the enrollee and the configurator. In an embodiment, a Wi-Fi technology object may indicate a Wi-Fi technology to be used in a DPP authentication operation, a DPP configuration operation, and/or the like.

(2) DPP Discovery Object

A DPP discovery object may include, for example, operating or discovery information such as a service set identifier (SSID), an operating channel, or an operating band, and/or the like.

(3) Credential Object

A credential object may include credential information which is provisioned by an enrollee to obtain a secure network access. The credential information may depend on a value of an authentication and key management (AKM) type parameter included in a DPP configuration object.

In an embodiment, DPP configuration object parameters may be shown in Table 1 below.

TABLE 1

| Parameter | Name | Type | Value | Scope | Description |
| --- | --- | --- | --- | --- | --- |
| DPP Configuration object | DPP Configuration object | OBJECT | | M | |
| Wi-Fi Technology object | wi-fi_tech | STRING | infra | M | The wi-fi_tech value indicates which DPP Configuration Attribute object parameters are present beyond the mandatory wi-fi_tech and what values those parameters use. This specification defines the wi-fi_tech = infra case. |
| Service | svc | STRING | | O | Optional parameter depending on the value of wi-fi_tech. |
| Discovery object: | discovery | OBJECT | | M | |
| SSID | ssid | STRING | UTF-8 encoded string | M | The SSID for the ESS encoded as a UTF-8 encoded string. |
| SSID64 | ssid64 | STRING | BASE64 URL encoded string | | The SSID for the ESS encoded as a BASE64URL string of octets. |

TABLE 1-continued

| Parameter | Name | Type | Value | Scope | Description |
|---|---|---|---|---|---|
| SSID character set | ssid_charset | INTEGER | MIBenum | | The value of the character set that would be used to convert the ssid64 octet string into characters (if known). MIBenum values for character sets can be found in https://www.iana.org/assignments/character-sets/character-sets.xhtml. |
| Credential object | cred | OBJECT | | M | |
| Authentication and Key Management Type | akm | STRING | psk, dpp, sae, psk + sae, dot1x, dpp + sae, dpp + psk + sae or (only if Enrollee indicates Protocol Version value of 2 or higher), a list of one or more AKM suite selectors, delimited with a "+" character | M | The authentication type(s) for the network: "psk" indicates one or more of the PSK and FT-PSK AKMs defined in [1] (typically at least "00-0F-AC:2" for interoperability) "sae" indicates one or more of the SAE and FT-SAE AKMs defined in [1] (typically at least "00-0F-AC:8" for interoperability) "dot1x" indicates one or more of the IEEE Std 802.1X AKMs defined in [1] (typically at least "00-0F-AC:1" for interoperability) "dpp" indicates one or more of the DPP and FT-DPP AKMs defined in section 8.4.2(typically at least "50-6F-9A:2" for interoperability) When a list of AKM suite selectors is provided, each AKM suite selector (OUI and Type) is encoded as a 4-octet hex-encoded value without internal delimiters, e.g. 506F9A02. |
| Pre-shared key | psk_hex | STRING | | C | Pre-shared key encoded in hex. Conditionally present when akm parameter value contains "psk" or a PSK AKM suite selector. |
| WPA2 Passphrase and/or SAE password | pass | STRING | | C | WPA2 or SAE passphrase. Conditionally present when akm parameter value contains psk or "sae", or a PSK and/or SAE AKM suite selector. |
| DPP Connector | signedConnector | STRING | | C | DPP Connector as a JWS, see section 4.2. Present when akm parameter value contains "dpp", or a DPP AKM suite selector or if the negotiated version is 2 or higher. |
| C-sign-key | Csign | JWK | | C | Configurator public key; "key_ops" and "use" objects in a "csign" object shall not be present. Present when akm parameter value contains "dpp", or a DPP AKM suite selector or if the negotiated version is 2 or higher. Note that JSON Web Keys use an uncompressed format. |
| Privacy-protection-key | ppKey | JWK | | C | Public Configurator privacy protection key, see section 6.5.2, that uses the same curve as the C-sign-key. Present when the negotiated version is 2 or higher. Note that JSON Web Keys use an uncompressed format. |
| Enterprise Credentials | entCreds | OBJECT | | C | Enterprise credentials for use when the akm parameter contains "dot1x". |

In Table 1, scope may refer, for example, to an applicability, M (mandatory) may indicate that a corresponding parameter will be used or exist, C (conditional) may specify that a usage of the corresponding parameter is based on a value of another parameter, and O (optional) may specify that the corresponding parameter may exist or be used, or may not exist, depending on discretion of an implementor of the corresponding parameter.

In Table 1, a parameter configurationObject may indicate a DPP Configuration object, and a parameter wi-fi_tech may indicate a Wi-Fi technology object.

In Table 1, a parameter svc may indicate a service and may depend on a value of the parameter wi-fi_tech. In an embodiment, the parameter svc may indicate service information.

In Table 1, a parameter discovery may indicate a discovery object, and a parameter ssid may indicate an SSID, for example, an SSID for an extended basic service set (ESS) which is encoded in a unicode transformation format (UTF)-8 encoded string. In Table 1, a parameter ssid64 may indicate an SSID64, for example, an SSID for an ESS encoded a BASE64URL string of octets, and a parameter ssid_charset may indicate an SSID character set. In an embodiment, the SSID character set may indicate a set of characters to be used to convert an ssid64 octet string into characters.

In Table 1, a parameter cred may indicate a credential object, and a parameter akm may indicate an authentication and key management type. In Table 1, [2] may represent RFC 5297, Synthetic Initialization Vector (SIV) Authenticated Encryption Using the Advanced Encryption Standard (AES), October 2008, https://datatracker.ietf.org/doc/rfc5297/, and section 8.4.2 may represent a section 8.4.2 in Wi-Fi_Easy_Connect_Specification_v2.0.

In Table 1, a parameter psk_hex may indicate a pre-shared key, and a parameter pass may indicate a Wi-Fi protected access2 (WPA2) passphrase and/or simultaneous authentication of equals (SAE) password.

In Table 1, a parameter signedConnector may indicate a DPP connector, a parameter csign may indicate a C-sign-key, a parameter ppKey may indicate a privacy-protection-key, and a parameter entCreds may indicate enterprise credentials.

In an embodiment, in a DPP configuration operation, network configuration information, e.g., a DPP configuration object, including network information such as secure credential information and an SSID may be transmitted from a configurator to an enrollee. In an embodiment, the secure credential information may include a connector, the connector may be credential information provisioned by the enrollee, and the connector may be used by a pair of enrollees to set security association using a DPP network introduction protocol.

In an embodiment, the connector may be a credential signed by the configurator, and may be used by a enrollee client to connect to an enrollee AP. In an embodiment, the configurator may own, for example, a c-sign-key and a C-sign-key which are a signing key pair, the c-sign-key may be used by the configurator to sign connectors, and the C-sign-key may be used for provisioned DPP devices to verify connectors of other DPP devices which are signed by the same configurator.

A connector of each enrollee may include a public key, a network role, and group attribute information, and may be signed by a configurator. The public key may provide an ID of a corresponding enrollee. The network role may indicate whether the corresponding enrollee will enroll as an enrollee client or an enrollee STA or whether the corresponding enrollee will enroll as an enrollee AP. The group attribute information may be used for detecting whether an enrollee may establish a network connection. A connector signature may prove that corresponding connector contents were generated by the configurator. A connector includes a public key rather than a password, so secure credential information may be different per Wi-Fi device, e.g., per enrollee. That is, another enrollee may not access a network using the corresponding connector, and a case that an enrollee corresponding to the corresponding connector belongs to a specific AP may refer, for example, to another AP not impersonating the specific AP.

In an embodiment, the enrollee client may discover the enrollee AP based on network information. The enrollee client may perform an authentication operation based on a connector, and establish a network connection based on a network introduction (NI) protocol. An advantage of using the connector may include, for example, that each enrollee connected to an AP has unique secure credential information.

Figure 7:
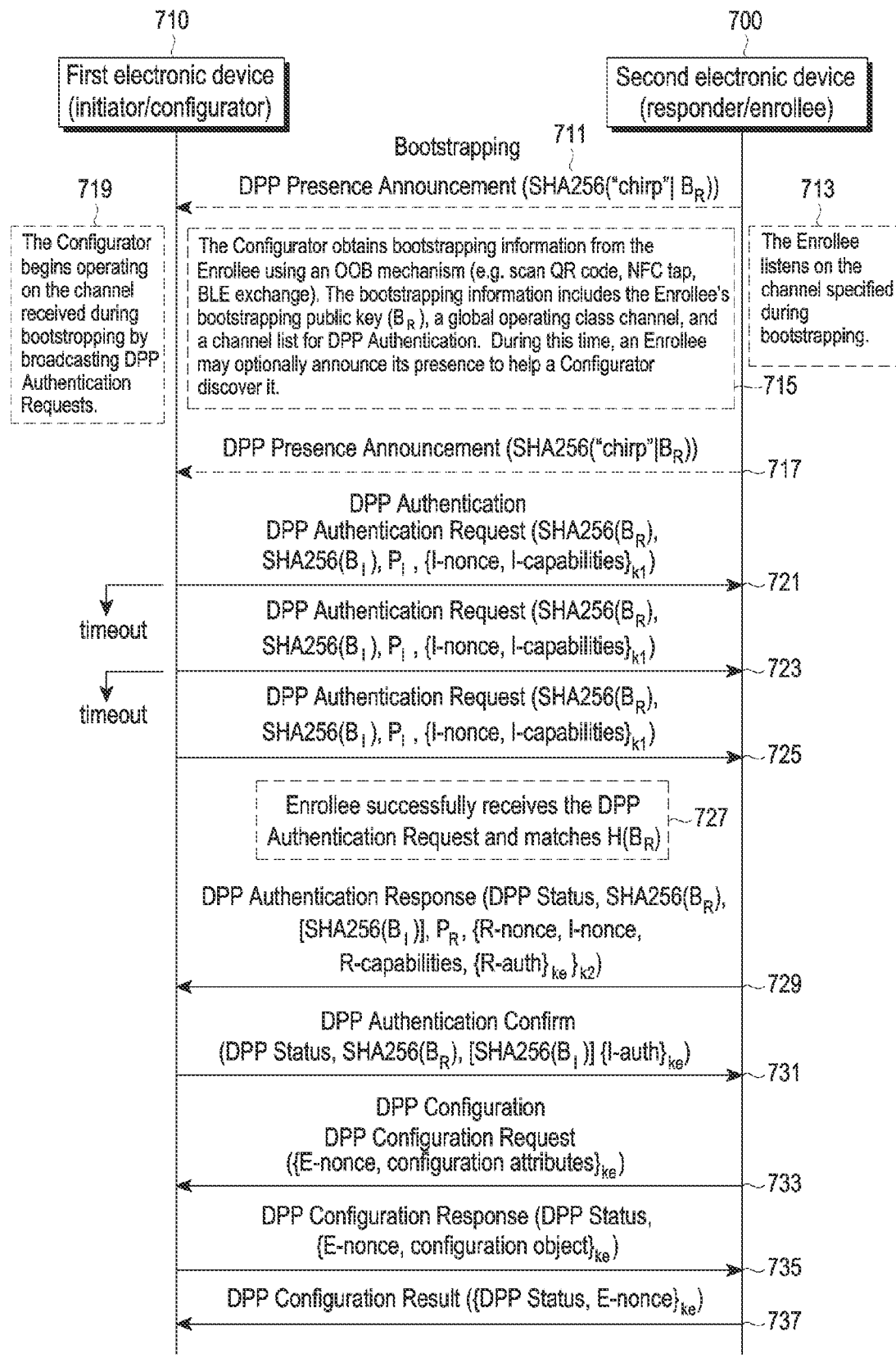
FIG. 7 is a signal flow diagram illustrating an example provisioning process in a DPP network according to various embodiments.

FIG. 7 is a signal flow diagram illustrating an example provisioning process in a DPP network according to various embodiments.

Referring to FIG. 7, each of an electronic device, for example, a first electronic device 710, and an external electronic device, for example, a second electronic device 700 may be a DPP device, and it will be assumed that the first electronic device 710 operates as both a configurator and an initiator, and the second electronic device 700 operates as both an enrollee and a responder.

In operation 711, the second electronic device 700 operating as both the enrollee and the responder may transmit a DPP presence announcement frame. In an embodiment, the DPP presence announcement frame may be used to signal, to the initiator which is the configurator, that the responder is ready to participate in DPP exchange, and may include a hash including a public bootstrapping key of a transmitter, e.g., the responder. In an embodiment, the hash including the public bootstrapping key of the responder may be secure information used in a DPP bootstrapping operation. In an embodiment, a hash for the DPP presence announcement frame to prevent leakage of a hash of a public key of a unprovisioned device may be SHA256("chirp" | $B_R$). In an embodiment, $B_R$ may represent the public bootstrapping key of the responder, for example, the second electronic device 700.

In operation 713, the second electronic device 700 may perform a listening operation on a specified channel during the DPP bootstrapping operation. The first electronic device 710 which operates as both the configurator and the initiator may use an out-of-band (OOB) mechanism, for example, QR code scan, NFC tap, or BLE exchange to obtain bootstrapping information from the second electronic device 700. In an embodiment, the bootstrapping information may include the public bootstrapping key ($B_R$) of the second electronic device 700, a global operating class channel, and/or a channel list for DPP authentication. During the DPP bootstrapping operation, in operation 715, the second electronic device 700 may selectively announce presence of the second electronic device 700 to help the first electronic device 710 discover the second electronic device 700. In operation 717, the second electronic device 700 may transmit a DPP presence announcement frame. For example, the second electronic device 700 may periodically transmit a DPP presence announcement frame.

In operation 719, the first electronic device 710 may begin operating on a channel based on channel information received during bootstrapping by broadcasting DPP authentication request frames. For example, the first electronic device 710 may continuously broadcast DPP authentication request frames in operations 721, 723, and 725. In an embodiment, a DPP authentication request frame may include $SHA256(B_R)$, $SHA256(B_I)$, $P_I$, and $\{\text{I-nonce, I-capabilities}\}_{k1}$. For example, $SHA256(B_R)$ may represent a SHA256 hash for $B_R$, $B_I$ may represent a public bootstrapping key of the first electronic device 710, $SHA256(B_I)$ may represent a SHA256 hash for $B_I$, $P_I$ may represent a public protocol key of the electronic device 710, I-nonce may represent an initiator nonce attribute, I-capabilities may represent an initiator capabilities attribute, and k1 may represent a first intermediate key. In an embodiment, $\{\text{I-nonce, I-capabilities}\}_{k1}$ may represent I-nonce and I-capabilities which are encrypted with k1. In an embodiment, at least one of $SHA256(B_R)$, $SHA256(B_I)$, $P_I$, or $\{\text{I-nonce, I capabilities}\}_{k1}$ included in the DPP authentication request frame may be secure information used in a DPP authentication operation.

In operation 727, if the first electronic device 710 broadcasts the DPP authentication request frames and the second electronic device 700 successfully receives this DPP authentication request frame, the second electronic device 700 may match $H(B_R)$ which is a hash function value for $B_R$. In operation 729, the second electronic device 700 may transmit, to the first electronic device 710, a DPP authentication response frame which is a response frame to the DPP authentication request frame. In an embodiment, the DPP authentication response frame may include a DPP status field, $SHA256(B_R)$, $[SHA256(B_I)]$, $P_R$, and $\{\text{R-nonce, I-nonce, R-capabilities,} \{\text{R-auth}\}_{ke}\}_{k2}$. For example, $P_R$ may represent a public protocol key of the second electronic device 700, R-nonce may represent a responder nonce attribute, R-capabilities may represent a responder capabilities attribute, R-auth may represent an authentication tag of the responder, for example, the second electronic device 700, ke may represent an encryption key, k2 may represent a second intermediary key, and [ ] may represent a value optionally present. For example, $[SHA256(B_I)]$ may be optionally included in the DPP authentication response frame or may be included in the DPP authentication response frame if a specific condition is satisfied. In an embodiment, $\{\text{R-auth}\}_{ke}$ may represent R-auth encrypted with a key. In an embodiment, $\{\text{R-nonce, I-nonce, R-capabilities,} \{\text{R-auth}\}_{ke}\}_{k2}$ may represent R-nonce, I-nonce, R-capabilities, and $\{\text{R-auth}\}_{ke}$ which are encrypted with k2. In an embodiment, at least one of $SHA256(B_R)$, $[SHA256(B_I)]$, $P_R$, or $\{\text{R-nonce, I-nonce, R-capabilities,} \{\text{R-auth}\}_{ke}\}_{k2}$ included in the DPP authentication response frame may be secure information used in the DPP authentication operation.

The DPP status field may indicate a status as shown in Table 2 below.

TABLE 2

| Status or Error | Value | Meaning |
| --- | --- | --- |
| STATUS_OK | 0 | No errors or abnormal behavior |
| STATUS_NOT_COMPATIBLE | 1 | The DPP Initiator and Responder have incompatible capabilities |
| STATUS_AUTH_FAILURE | 2 | Authentication failed |
| STATUS_BAD_CODE | 3 | The code used in PKEX is bad |
| STATUS_BAD_GROUP | 4 | An unsupported group was offered |
| STATUS_CONFIGURE_FAILURE | 5 | Configurator refused to configure Enrollee |
| STATUS_RESPONSE_PENDING | 6 | Responder will reply later |
| STATUS_INVALID_CONNECTOR | 7 | Received Connector is invalid for some reason. The sending device needs to be reconfigured. |
| STATUS_NO_MATCH | 8 | Received Connector is verified and valid but no matching Connector could be found. The receiving device needs to be reconfigured. |
| STATUS_CONFIG_REJECTED | 9 | Enrollee rejected the configuration. |
| STATUS_NO_AP | 10 | Enrollee failed to discover an access point. |
| STATUS_CONFIGURE_PENDING | 11 | Configuration response is not ready yet. The enrollee needs to request again. |
| STATUS_CSR_NEEDED | 12 | Configuration requires a Certificate Signing Request. The enrollee needs to request again. |
| STATUS_CSR_BAD | 13 | The Certificate Signing Request was invalid. |
| STATUS_NEW_KEY_NEEDED | 14 | The Enrollee needs to generate a new Protocol key. |

In operation 731, the first electronic device 710 receiving the DPP authentication response frame from the second electronic device 700 may transmit a DPP authentication confirm frame to the second electronic device 700. In an embodiment, the DPP authentication confirm frame may include a DPP status field, $SHA256(B_R)$, $[SHA256(B_I)]$, and $\{\text{I-auth}\}_{ke}$. In an embodiment, I-auth may represent an authenticating tag of the initiator, for example, the first electronic device 710, and ke may represent the encryption key. In an embodiment, $\{\text{I-auth}\}_{ke}$ may represent I-auth encrypted with a key.

In operation 733, the second electronic device 700 receiving the DPP authentication confirm frame from the first electronic device 710 may transmit a DPP configuration request frame to the first electronic device 710. In an embodiment, the DPP configuration request frame may include $\{\text{E-nonce, configuration attributes}\}_{ke}$. In an embodiment, E-nonce may represent an E-nonce attribute, and configuration attributes may represent configuration attribute objects. A configuration attribute object may include at least one of a device name attribute, a Wi-Fi technology attribute, or a network role attribute. In an embodiment, $\{\text{E-nonce, configuration attributes}\}_{ke}$ may represent E-nonce and configuration attributes which are encrypted with a key.

In operation 735, the first electronic device 710 receiving the DPP configuration request frame may transmit, to the second electronic device 700, a DPP configuration response frame which is a response to the DPP configuration request frame. In an embodiment, the DPP configuration response frame may include a DPP status field and {E-nonce, configuration object}$_{ke}$. In an embodiment, a configuration object may represent a DPP configuration object. In an embodiment, {E-nonce, configuration object}$_{ke}$ may represent an E-nonce and a configuration object which are encrypted with a key.

In operation 737, the second electronic device 700 receiving the DPP configuration response frame may transmit a DPP configuration result frame to the first electronic device 710. In an embodiment, the DPP configuration result frame may include {DPP Status, E-nonce}$_{ke}$. In an embodiment, {DPP Status, E-nonce}$_{ke}$ may represent a DPP Status and an E-nonce which are encrypted with a key.

In an embodiment, a network introduction protocol is used so that an enrollee client may be securely connected to an enrollee AP using a connector provided by a configurator, and a DPP access operation which is based on the network introduction protocol may be as follows.

(1) Each of enrollee clients and the enrollee AP may identify whether a connector of each of the enrollee clients and the enrollee AP is signed by the configurator.

(2) Each of the enrollee clients may can identify that a role of each of the enrollee clients is compatible and establish a communication with the enrollee AP.

(3) The enrollee clients may identify whether group attributes are matched.

(4) Each of the enrollee AP and the enrollee clients may derive a pairwise master key (PMK) based on a public connector key.

(5) A connection may be established between the enrollee AP and the enrollee clients based on the derived PMK.

Figure 8:
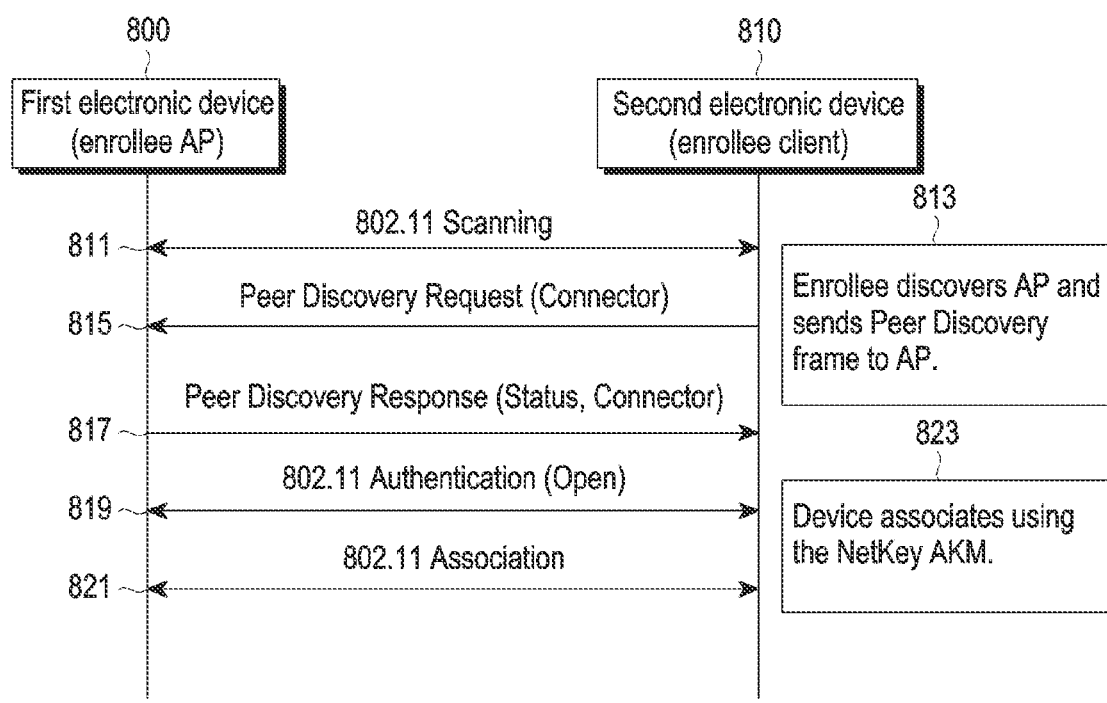
FIG. 8 is a signal flow diagram illustrating an example network access operation using a connector according to various embodiments.

FIG. 8 is a signal flow diagram illustrating an example network access operation using a connector according to various embodiments.

Referring to FIG. 8, each of an electronic device, for example, a first electronic device 800, and an external electronic device, for example, a second electronic device 810 may be a DPP device, and it will be assumed that the first electronic device 800 may operate as an enrollee AP, and the second electronic device 810 operates as an enrollee client.

In operation 811, the second electronic device 810 as the enrollee client may perform an IEEE 802.11 scanning operation which is based on an IEEE 802.11 standard. In operation 813, the second electronic device 810 may discover the first electronic device 800 which is the enrollee AP according to performance of an IEEE 802.11 scanning operation. In operation 815, the second electronic device 810 may transmit, to the discovered first electronic device 800, a peer discovery request frame including a connector attribute. In operation 817, the first electronic device 800 may receive the peer discovery request frame from the second electronic device 810, and transmit, to the second electronic device 810, a peer discovery response frame in response to the peer discovery request frame. In an embodiment, the peer discovery response frame may include a connector attribute and a state attribute, and the state attribute may indicate a DPP state attribute.

In operation 819, upon receiving the peer discovery response frame from the first electronic device 800, the second electronic device 810 may perform an IEEE 802.11 authentication operation which is based on the IEEE 802.11 standard with the first electronic device 800. In operation 821, the second electronic device 810 may perform, with the first electronic device 800, an IEEE 802.11 association operation which is based on the IEEE 802.11 standard. In operation 823, the second electronic device 810 may be associated with the first electronic device 800 using an authentication and key management (AKM) which is a network key.

A DPP connection status result according to various embodiments of the disclosure will be described in greater detail below.

According to an embodiment, if both an enrollee and a configurator use a DPP whose version is a specific protocol version which is greater than or equal to, for example, 2, and a DPP configuration operation between the configurator and the enrollee is successful, the configurator may request the enrollee to provide feedback on an attempt to use a configuration applied to a DPP configuration object received through the successful DPP configuration operation.

According to an embodiment, this feedback request may be used if the enrollee is an enrollee STA, and the configurator may receive the feedback on the attempt to use the configuration applied to the DPP configuration object which is received from the enrollee through the successful DPP configuration operation if the DPP configuration operation between the configurator and the enrollee by including a sendConnStatus attribute which is an attribute requesting to transmit connection status into a DPP configuration response frame.

In an embodiment, the enrollee receiving the DPP configuration response frame may discover an AP to which the enrollee will be connected based on a DPP configuration object included in the DPP configuration response frame, and may attempt to connect to the discovered AP. If the sendConnStatus attribute is included in the DPP configuration response frame, the enrollee may transmit, to the configurator, a DPP configuration result frame which confirms receipt of the DPP configuration object and status for a connection attempt to which the configurator applies the DPP configuration object.

In an embodiment, status for a connection attempt to which a DPP configuration object is applied may be indicated through a DPP connection status object, and DPP status values which may be included in the DPP connection status object are as shown in Table 3 below.

TABLE 3

| Connection Attempt Result | DPP Status |
| --- | --- |
| Enrollee successfully associated to the AP and has network access | STATUS_OK |
| Enrollee discovered the AP and failed to connect to the network. | STATUS_AUTH_FAILURE |
| Enrollee received an invalid Connector during network introduction. | STATUS_INVALID_CONNECTOR |

TABLE 3-continued

| Connection Attempt Result | DPP Status |
|---|---|
| Received AP Connector is verified and valid but no matching Connector could be found by Enrollee. | STATUS_NO_MATCH |
| Enrollee failed to discover an access point. | STATUS_NO_AP |

In Table 3, if an enrollee is successfully associated with an AP and has a network access, a DPP status value may be set to "STATUS_OK". In Table 3, if the enrollee discovers the AP but fails to connect to a network, the DPP status value may be set to "STATUS_AUTH_FAILURE". In Table 3, the DPP status value may be set to "STATUS_INVALID_CONNECTOR" if the enrollee receives an invalid connector during network introduction. In Table 3, if a received AP connector is verified and valid, but no matching connector is detected by the enrollee, the DPP status value may be set to "STATUS_NO_MATCH". In Table 3, if the enrollee fails to discover the AP, the DPP status value may be set to "STATUS_NO_AP".

A configurator delegation operation according to various embodiments of the disclosure will be described.

In a DPP network, it may be required to make use of multiple configurators for provisioning. In an embodiment, an already activated configurator, e.g., an existing configurator may delegate authority to a new configurator to share network management and provide backup for a configurator function. An operation in which the already activated configurator delegates the authority to the new configurator may be referred to as "configurator delegation operation". In an embodiment, "configurator delegation operation" may refer, for example, to an operation in which a first configurator (hereinafter, referred to as "first configurator") which is the already activated configurator provides, to a second configurator (hereinafter, referred to as "second configurator") which is the new configurator, network configuration information, e.g., a DPP configuration object, which the first configurator manages. In an embodiment, the configurator delegation operation may be included in a network management operation provided by the configurator.

In an embodiment, the network configuration information provided from the first configurator to the second configurator through the configurator delegation operation may be enveloped network configuration information, and the enveloped network configuration information may include network configuration information managed by the first configurator, e.g., encrypted network configuration information which is generated by encrypting a DPP configuration object based on a set encryption scheme and information about the encryption scheme. In an embodiment, the encryption scheme may be a scheme which is based on an encryption key. In an embodiment, the enveloped network configuration information may be referred to as "DPPEnvelopedData". In an embodiment, the operation of delegating the authority to the new configurator, for example, the configurator delegation operation may be performed through a DPP configuration backup and restore process.

Figure 9:
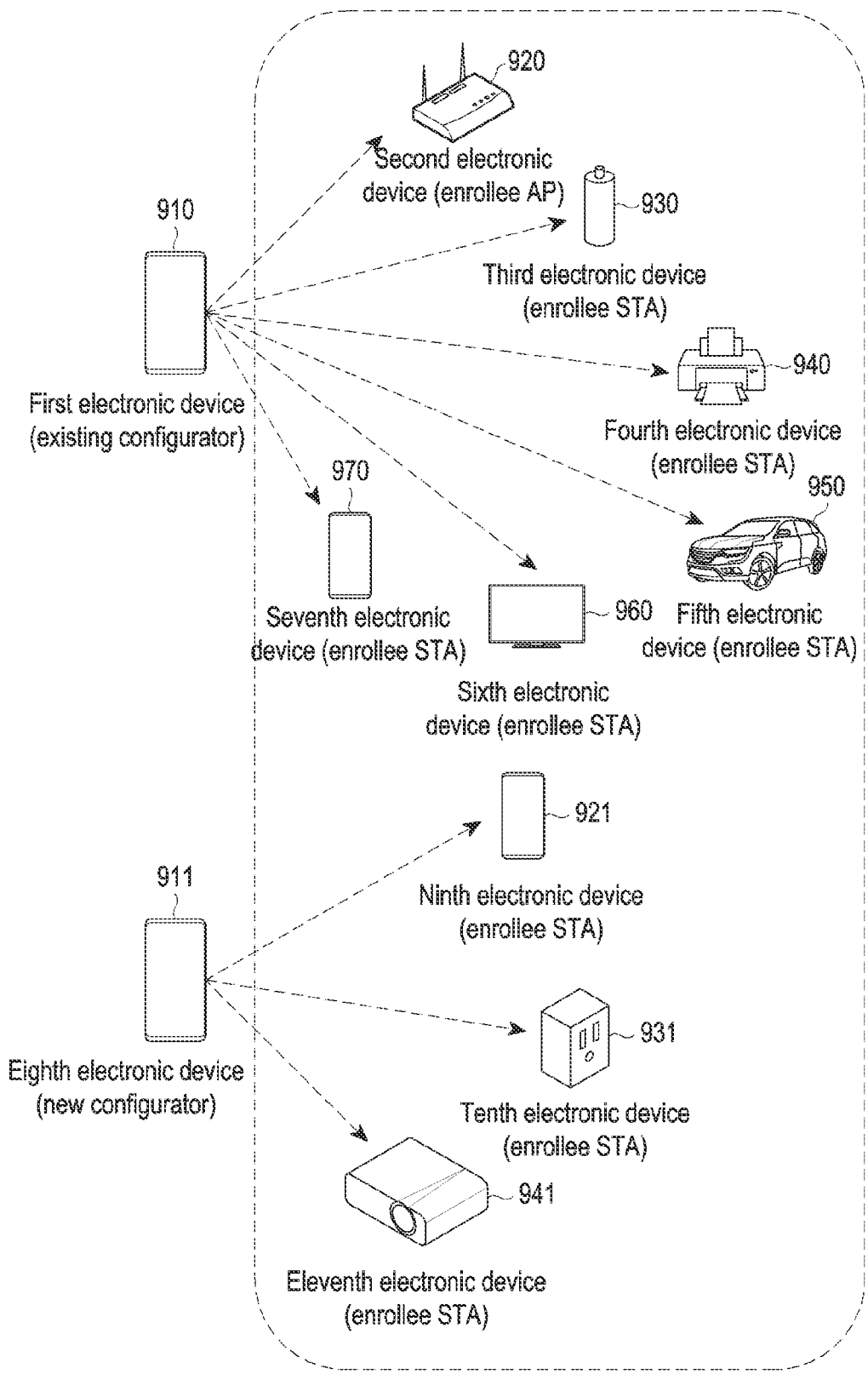
FIG. 9 is a diagram illustrating an example configurator delegation operation in a DPP network according to various embodiments.

FIG. 9 is a diagram illustrating an example configurator delegation operation in a DPP network according to various embodiments.

Referring to FIG. 9, if it is required to make use of a plurality of configurators for provisioning, an already activated configurator may delegate authority to a new configurator to share network management and provide backup for a configurator function. In an embodiment, a DPP network may include a plurality of electronic devices, for example, an electronic device (e.g., an electronic device 101 in FIG. 1 or a first electronic device 910) and external electronic devices (e.g., an electronic device 102 or an electronic device 104 in FIG. 1, or a second electronic device 920, a third electronic device 930, a fourth electronic device 940, a fifth electronic device 950, a sixth electronic device 960, a seventh electronic device 970, an eighth electronic device 911, a ninth electronic device 921, a tenth electronic device 931, and an eleventh electronic device 941).

In FIG. 9, the first electronic device 910 may operate as a configurator, the second electronic device 920 may operate as an enrollee AP, and each of the third electronic device 930, the fourth electronic device 940, the fifth electronic device 950, the sixth electronic device 960, and the seventh electronic device 970 may operate as an enrollee STA. In an embodiment, the first electronic device 910 may be an already activated configurator.

In an embodiment, if it is required to make use of the plurality of configurators for the provisioning, the first electronic device 910 which is the already activated configurator (e.g., which currently operates as the configurator) may identify that the eighth electronic device 911 is a new (or additional) configurator to be activated, and delegate authority to the eighth electronic device 911 which is the new configurator so that the eighth electronic device 911 may share network management and receive a backup for a configurator function. In an embodiment, an enrollee, e.g., the eighth electronic device 911, which will operate as the new configurator may be selected through a higher layer, e.g., an application layer. In an embodiment, the eighth electronic device 911 may be selected as the new configurator based on a user input input through an UI. In an embodiment, the enrollee, e.g., the eighth electronic device 911, which will operate as the new configurator may also be selected by the first electronic device 910.

The eighth electronic device 911 which is the new configurator may receive enveloped network configuration information from the first electronic device 910 which is the already activated configurator. In an embodiment, the enveloped network configuration information may include network configuration information managed by the first configurator 910, e.g., encrypted network configuration information which is generated by encrypting a DPP configuration object based on a set encryption scheme and information about the encryption scheme. The eighth electronic device 911 may operate as the configurator based on the enveloped network configuration information received from the first electronic device 910. The eighth electronic device 911 may operate as the configurator, and each of the sixth electronic device 960, the ninth electronic device 921, the tenth electronic device 931, and the eleventh electronic device 941 may operate as an enrollee connected to the eighth electronic device 911.

An operation, for example, a configurator delegation operation, for configuring a plurality of configurators according to various embodiments of the disclosure will be described in greater detail below.

In an embodiment, if it is required to make use of a plurality of configurators for provisioning in a DPP network, the plurality of configurators may be configured in a way of sharing a key pair (sign and verification) for sharing network configuration information. In an embodiment, the key pair (sign and verification) for sharing the network configuration information may be a configurator signing key. The configurator signing key may be generated by a configurator and may be used to sign connector credentials. In an embodiment, the configurator sign key may be a sign key pair, and the sign key pair may include a c-sign-key and a C-sign-key. The c-sign-key may be used by the configurator to sign connectors, and the C-sign-key may be used for provisioned DPP devices to verify connectors of other DPP devices signed by the same configurator.

An operation for activating a configurator, e.g., a configurator delegation operation according to various embodiments of the disclosure will be described in greater detail below.

In an embodiment, a configurator may be activated through a DPP configuration backup and restore process. An already activated configurator, e.g., a first configurator may encrypt network configuration information, e.g., DPP configuration information (e.g., a DPP configuration object) based on a set encryption scheme to generate encrypted DPP configuration information, and generate DPPEnvelopedData including the encrypted DPP configuration information and the encryption scheme. In an embodiment, the encryption scheme may be a scheme which is based on an encryption key.

The first configurator may transmit the generated DPPEnvelopedData to a new configurator, e.g., a second configurator, and the second configurator may decrypt the received DPPEnvelopedData based on a decryption scheme which corresponds to the encryption scheme applied by the first configurator to store the DPP configuration information managed by the first configurator, thereby the second configurator may be activated. In an embodiment, the new configurator may be selected based on various schemes, and for example, information about an enrollee, e.g., a DPP device, to be activated as the new configurator is input through an UI of the first configurator, and the new configurator may be selected based on the input information.

In an embodiment, a configurator may be activated through a DPP configuration operation. If a DPP device operating as an enrollee is selected as a new configurator, e.g., a second configurator, the enrollee may transmit, to an already activated configurator, e.g., a first configurator, a DPP configuration request frame in which a netRole parameter indicating a network role (netRole) to be provisioned is set to "configurator" indicating a configurator. In an embodiment, the new configurator may be selected based on various schemes, and for example, information selected so that the enrollee is activated as the new configurator is input through a UI of the enrollee, and the enrollee may identify that the enrollee will be activated as the new configurator based on the input information.

In an embodiment, a network role in a DPP network may include an STA, an AP, and a configurator, and a netRole parameter included in a DPP configuration request frame may indicate how an enrollee operates in the DPP network. For example, if the netRole parameter included in the DPP configuration request frame is set to "configurator", it may indicate that the enrollee wants to operate as a configurator.

Upon receiving the DPP configuration request frame in which the netRole parameter is set to "configurator", the first configurator may encrypt network configuration information, e.g., a DPP configuration object, which is managed by the first configurator based on a set encryption scheme to generate encrypted DPP configuration object, and generate DPPEnvelopedData including the encrypted DPP configuration object and the encryption scheme. In an embodiment, the encryption scheme may be a scheme which is based on an encryption key. The first configurator may include the DPPEnvelopedData into a payload of a DPP configuration response frame which is a response frame to the DPP configuration request frame, and transmit, to the enrollee, the DPP configuration response frame including the DPPEnvelopedData. In an embodiment, the DPP configuration object may be the network configuration information, and may include at least one of a Wi-Fi description object, a DPP discovery object, or a credential object. The DPP discovery object may include, for example, operating or discovery information such as an SSID, an operating channel, or an operating band, and/or the like.

According to an embodiment, in a DPP network, a plurality of configurators may be configured based on a configurator delegation operation. If a new configurator is activated through the configurator delegation operation, the new configurator may share the same network configuration information with an existing configurator at a time point of activation, e.g., at a time point at which the new configurator obtains network configuration information from DPPEnvelopedData included in a DPP configuration response frame received from the existing configurator and is activated as the new configurator based on the obtained network configuration information. In an embodiment, a case in which an existing configurator and a new configurator share the same network configuration information may be referred to as "a case in which network configuration information of an existing configurator and network configuration information of a new configurator are synchronized".

However, a DPP specification currently does not specify how an existing configurator and a new configurator manage network configuration information after the new configurator is activated through a configurator delegation operation, for example, how the existing configurator and the new configurator synchronize the network configuration information. For example, after the existing configurator performs the configurator delegation operation and the new configurator is activated, the existing configurator and the new configurator may separately manage network configuration information. If a new enrollee AP is connected to the existing configurator after the configurator delegation operation, the network configuration information managed by the existing configurator may be updated, for example, may be changed. However, the new configurator may not know updated network configuration information of the existing configurator, so information about the new enrollee AP connected to the existing configurator may not be provided from the new configurator to an enrollee STA connected to the new configurator.

Although a DPP network may configure a multi-configurator environment in which a plurality of configurators are present, the plurality of configurators operate independently, so a benefit through the multi-configurator environment may not be obtained.

In various embodiments of the disclosure, a network management operation may be performed by a configurator. In an embodiment, the network management operation may include an operation of enrolling and provisioning devices for a D2D communication or an infrastructure communication, and a configurator delegation operation. In an embodiment, the configurator delegation operation may include an operation of delegating management of the configurator, e.g., network management of the configurator to another configurator, e.g., a new configurator for the configurator to share the management and provide a backup of capabilities, e.g., network configuration information (e.g., a DPP configuration object) of the configurator.

In various embodiments of the disclosure, an operation of managing network configuration information may include an operation of updating the network configuration information.

In various embodiments of the disclosure, the operation of managing the network configuration information may include an operation of synchronizing the network configuration information among a plurality of configurators. In an embodiment, an operation of sharing the same network configuration information by the plurality of configurators may be an operation of synchronizing the network configuration information among the plurality of configurators.

FIG. 10 is a signal flow diagram illustrating an example operation of managing network configuration information in a DPP network according to various embodiments.

Referring to FIG. 10, each of an electronic device (e.g., an electronic device 101 in FIG. 1), e.g., a first electronic device 1010, and an external electronic device (e.g., an electronic device 102 or an electronic device 104 in FIG. 1), e.g., a second electronic device 1000, a third electronic device 1030, or a fourth electronic device 1050 may be a DPP device. In an embodiment, it will be assumed that the first electronic device 1010 operates as both a configurator and an initiator, and each of the second electronic device 1000, the third electronic device 1030, and the fourth electronic device 1050 operates as both an enrollee and a responder. In an embodiment, it will be assumed that the second electronic device 1000 is an enrollee to be activated as a new configurator, the third electronic device 1030 is an enrollee configured through the first electronic device 1010 which is an existing configurator, and the fourth electronic device 1050 is an enrollee configured through the second electronic device 1000 which is the new configurator. In an embodiment, it will be assumed that the third electronic device 1030 is an enrollee AP, and the fourth electronic device 1050 is an enrollee STA.

In operation 1020, a configurator delegation operation for activating the second electronic device 1000 as a new configurator may be performed between the first electronic device 1010 operating as both the configurator and the initiator and the second electronic device 1000 operating as both the enrollee and the responder.

The configurator delegation operation (e.g., operation 1020) performed between the first electronic device 1010 and the second electronic device 1000 may be performed based on a DPP configuration backup and restore process, or may be performed based on a DPP configuration operation. In an embodiment, it will be assumed that the configurator delegation operation (e.g., operation 1020) performed between the first electronic device 1010 and the second electronic device 1000 is performed based on the DPP configuration operation.

The configurator delegation operation (e.g., operation 1020) performed between the first electronic device 1010 and the second electronic device 1000 will be described in greater detail below with reference to FIG. 11.

Figure 11:
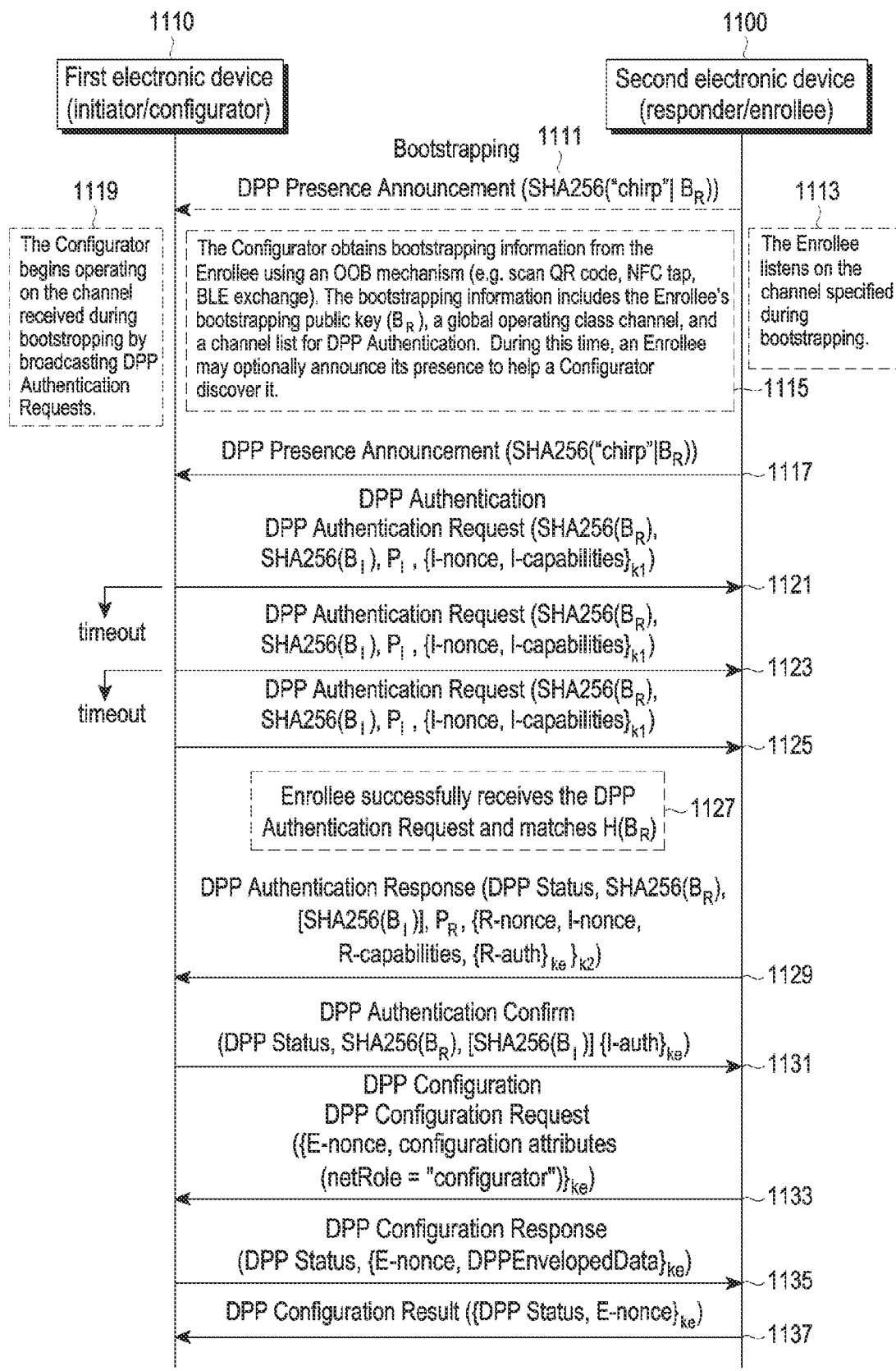
FIG. 11 is a signal flow diagram illustrating an example configurator delegation operation in a DPP network according to various embodiments.

FIG. 11 is a signal flow diagram schematically illustrating an example configurator delegation operation in a DPP network according to various embodiments.

Referring to FIG. 11, each of an electronic device (e.g., an electronic device 101 in FIG. 1), for example, a first electronic device 1110, and an external electronic device (e.g., an electronic device 102 or an electronic device 104 in FIG. 1), for example, a second electronic device 1100 may be a DPP device, and it will be assumed that the first electronic device 1110 operates as both a configurator and an initiator, and the second electronic device 1100 operates as both an enrollee and a responder. In an embodiment, it will be assumed that the second electronic device 1100 is a DPP device to be activated as a new configurator.

In operation 1111, the second electronic device 1100 operating as both the enrollee and the responder may transmit a DPP presence announcement frame. In an embodiment, the DPP presence announcement frame may be used to signal, to the initiator which is the configurator, that the responder is ready to participate in DPP exchange, and may include DPP bootstrapping information. In an embodiment, the DPP bootstrapping information may include a hash including a public bootstrapping key of a transmitter, e.g., the responder. In an embodiment, the hash including the public bootstrapping key of the responder may be secure information used in a DPP bootstrapping operation. In an embodiment, a hash for the DPP presence announcement frame to prevent leakage of a hash of a public key of a unprovisioned device may be SHA256("chirp" | $B_R$). In an embodiment, $B_R$ may represent a public bootstrapping key of the responder, for example, the second electronic device 1100.

In operation 1113, the second electronic device 1100 may perform a listening operation on a specified channel during the DPP bootstrapping operation. The first electronic device 1110 which operates as both the configurator and the initiator may use an OOB mechanism, for example, QR code scan, NFC tap, or BLE exchange to obtain DPP bootstrapping information from the second electronic device 1100. In an embodiment, the DPP bootstrapping information may include a public bootstrapping key ($B_R$) of the second electronic device 1100, a global operating class channel, and/or a channel list for DPP authentication.

During the DPP bootstrapping operation, in operation 1115, the second electronic device 1100 may selectively announce presence of the second electronic device 1100 to help the first electronic device 1110 discover the second electronic device 1100. In operation 1117, the second electronic device 1100 may transmit a DPP presence announcement frame. For example, the second electronic device 1100 may periodically transmit the DPP presence announcement frame.

In an embodiment, the DPP bootstrapping operation may be performed between a configurator and a plurality of enrollees, and, for convenience of a description, a DPP bootstrapping operation between one enrollee, e.g., the second electronic device 1100, and a configurator, e.g., the first electronic device 1110 is described in FIG. 11.

In operation 1119, the first electronic device 1110 may begin operating on a channel based on channel information received during bootstrapping by broadcasting DPP authentication request frames. For example, the first electronic device 1110 may continuously broadcast DPP authentication request frames in operations 1121, 1123, and 1125.

In an embodiment, a DPP authentication request frame may include SHA256($B_R$), SHA256($B_I$), $P_I$, and {I-nonce, I-capabilities}$_{k1}$. For example, SHA256($B_R$) may represent a SHA256 hash for $B_R$, $B_I$ may represent a public bootstrapping key of the first electronic device 1110, SHA256($B_I$) may represent a SHA256 hash for $B_I$, $P_I$ may represent a public protocol key of the electronic device 1110, I-nonce may represent an initiator nonce attribute, I-capabilities may represent an initiator capabilities attribute, and k1 may represent a first intermediate key. In an embodiment, {I-nonce, I-capabilities}$_{k1}$ may represent I-nonce and I-capabilities which are encrypted with k1. In an embodiment, at least one of SHA256($B_R$), SHA256($B_I$), $P_I$, or {I-nonce, I-capabilities}$_{k1}$ included in the DPP authentication request frame may be secure information used in a DPP authentication operation.

In operation 1127, if the first electronic device 1110 broadcasts the DPP authentication request frames and the second electronic device 1100 successfully receives this DPP authentication request frame, the second electronic device 1100 may match H($B_R$) which is a hash function value for $B_R$. In operation 1129, the second electronic device 1100 may transmit, to the first electronic device 1110, a DPP authentication response frame which is a response frame to the DPP authentication request frame. In an embodiment, the DPP authentication response frame may include a DPP status field, SHA256($B_R$), [SHA256($B_I$)], $P_R$, and {R-nonce, I-nonce, R-capabilities, {R-auth}$_{ke}$}$_{k2}$. For example, $P_R$ may represent a public protocol key of the second electronic device 1100, R-nonce may represent a responder nonce attribute, R-capabilities may represent a responder capabilities attribute, R-auth may represent an authentication tag of the responder, for example, the second electronic device 1100, ke may represent an encryption key, k2 may represent a second intermediary key, and [ ] may represent a value optionally present. For example, [SHA256($B_I$)] may be optionally included in the DPP authentication response frame or may be included in the DPP authentication response frame if a specific condition is satisfied. In an embodiment, {R-auth}ke may represent R-auth encrypted with a key. In an embodiment, {R-nonce, I-nonce, R-capabilities, {R-auth}$_{ke}$}$_{k2}$ may represent R-nonce, I-nonce, R-capabilities, and {R-auth}$_{ke}$ which are encrypted with k2. In an embodiment, at least one of SHA256($B_R$), [SHA256($B_I$)], $P_R$, or {R-nonce, I-nonce, R-capabilities, {R-auth}$_{ke}$}$_{k2}$ included in the DPP authentication response frame may be secure information used in the DPP authentication operation. The DPP status field has been described in Table 2, so a description of the DPP status field will not be included here.

In operation 1131, the first electronic device 1110 receiving the DPP authentication response frame from the second electronic device 1100 may transmit a DPP authentication confirm frame to the second electronic device 1100. In an embodiment, the DPP authentication confirm frame may include a DPP status field, SHA256($B_R$), [SHA256($B_I$)], and {I-auth}$_{ke}$. In an embodiment, I-auth may represent an authenticating tag of the initiator, for example, the first electronic device 1110, and ke may represent the encryption key. In an embodiment, {I-auth}$_{ke}$ may represent I-auth encrypted with a key. In an embodiment, operation 1131 may be omitted if necessary.

In operation 1133, the second electronic device 1100 receiving the DPP authentication confirm frame from the first electronic device 1110 may transmit a DPP configuration request frame to the first electronic device 1110. In an embodiment, an enrollee, e.g., the second electronic device 1100, which will operate as a new configurator may be selected through a higher layer, for example, an application layer. In an embodiment, the second electronic device 1100 may identify, through a UI, that the second electronic device 1100 is the enrollee to be activated as the new configurator. In an embodiment, the enrollee, e.g., the second electronic device 1100, which will operate as the new configurator may also be selected by the first electronic device 1110.

In an embodiment, upon identifying that the second electronic device 1100 is selected to operate as the configurator, the second electronic device 1100 may include network role information, for example, network role information indicating a configurator into a DPP configuration request frame. In an embodiment, the second electronic device 1100 may include the network role information indicating the configurator in the DPP configuration request frame based on identifying that the second electronic device 1100 is selected to operate as the configurator. In an embodiment, the network role information may be implemented through a netRole parameter, and if a parameter value of the netRole parameter is set to "configurator", it may indicate that the network role is the configurator. In an embodiment, the DPP configuration request frame may include {E-nonce, configuration attributes (netRole="configurator")}$_{ke}$. In an embodiment, E-nonce may represent an E-nonce attribute, and configuration attributes may represent configuration attribute objects. A configuration attribute object may include at least one of a device name attribute, a Wi-Fi technology attribute, or a network role attribute. In an embodiment, {E-nonce, configuration attributes (netRole="configurator")}$_{ke}$, may represent E-nonce and configuration attributes (netRole="configurator") which are encrypted with a key.

In operation 1135, the first electronic device 1110 receiving the DPP configuration request frame may identify that the second electronic device 1100 may operate as the configurator based on the netRole parameter included in the DPP configuration request frame. In an embodiment, the first electronic device 1110 may encrypt network configuration information, for example, a DPP configuration object, which is managed by the first electronic device 1110 based on a set encryption scheme to generate encrypted DPP configuration information, and generate DPPEnvelopedData including the encrypted DPP configuration information and the encryption scheme. In an embodiment, the encryption scheme may be a scheme based on an encryption key. The first electronic device 1110 may include the DPPEnvelopedData into a payload of a DPP configuration response frame which is a response frame to the DPP configuration request frame, and transmit the DPP configuration response frame including the DPPEnvelopedData to the second electronic device 1100. In an embodiment, the DPP configuration object may be network configuration information, and may include at least one of a Wi-Fi technology object, a DPP discovery object, or a credential object, and the DPP discovery object may include, for example, operating or discovery information such as an SSID, an operating channel, or an operating band, and/or the like. In an embodiment, the DPP configuration response frame may include a DPP status field and {E-nonce, DPPEnvelopedData}$_{ke}$. In an embodiment, {E-nonce, DPPEnvelopedData}$_{ke}$ may represent E-nonce and DPPEnvelopedData which are encrypted with the key.

Upon receiving the DPP configuration response frame, the second electronic device 1100 may use the network configuration information managed by the first electronic device 1110 based on the DPPEnvelopedData included in the DPP configuration response frame, so the second electronic device 1100 may operate as the new configurator. In operation 1137, the second electronic device 1100 receiving the DPP configuration response frame may transmit a DPP configuration result frame to the first electronic device 1110. In an embodiment, the DPP configuration result frame may include {DPP Status, E-nonce}$_{ke}$. In an embodiment, {DPP Status, E-nonce}$_{ke}$ may represent DPP Status and E-nonce which are encrypted with the key.

Referring back to FIG. 10, as the configurator delegation operation (e.g., operation 1020) is completed between the first electronic device 1010 and the second electronic device 1000, not only the first electronic device 1010 but also the second electronic device 1000 may also operate as the configurator.

In a multi-configurator environment in which both the first electronic device 1010 and the second electronic device 1000 operate as the configurator, the first electronic device 1010 may perform a DPP provisioning process with the third electronic device 1030 which is a new enrollee.

The DPP provisioning process performed between the first electronic device 1010 and the third electronic device 1030 will be described in greater detail below.

In operation 1031, the first electronic device 1010 may perform a DPP boost trapping operation with the third electronic device 1030. A DPP boosting operation (e.g., operation 1031) performed between a configurator and an enrollee has been described in FIG. 7 (e.g., operations 711 to 717) and FIG. 11 (e.g., operations 1111 to 1117), a description of the DPP bootstrapping operation performed between the first electronic device 1010 and the third electronic device 1030 may not be repeated here.

In operation 1033, the first electronic device 1010 may perform a DPP authentication operation with the third electronic device 1030. A DPP authentication operation (e.g., operation 1033) performed between a configurator and an enrollee has been described in FIG. 7 (e.g., operations 719 to 731) and FIG. 11 (e.g., operations 1119 to 1131), a description of the DPP authentication operation performed between the first electronic device 1010 and the third electronic device 1030 may not be repeated here.

In operation 1035, the third electronic device 1030 may transmit a DPP configuration request frame to the first electronic device 1010. In an embodiment, the third electronic device 1030 may be selected to operate as an enrollee AP, and may include network role information indicating the enrollee AP into the DPP configuration request frame based on that the third electronic device 1030 is selected to operate as the enrollee AP. In an embodiment, network role information may be implemented through a netRole parameter, and if a parameter value of the netRole parameter is set to "ap", it may indicate that a network role of the third electronic device 1030 is the enrollee AP. Remaining parameters included in the DPP configuration request frame except for the network role information have been described in FIG. 7 (e.g., operation 733) and FIG. 11 (e.g., operation 1133), a description of the remaining parameters included in the DPP configuration request frame may not be repeated here.

In operation 1037, the first electronic device 1010 receiving the DPP configuration request frame may identify that the third electronic device 1030 requests to operate as the enrollee AP based on the netRole parameter included in the DPP configuration request frame. In operation 1037, the first electronic device 1010 may transmit, to the third electronic device 1030, a DPP configuration response frame which is a response to the DPP configuration request frame. In an embodiment, the DPP configuration response frame may include ssid and akm.

In an embodiment, the DPP configuration response frame may include psk, pass, and a DPP connector if necessary. The ssid, akm, psk, pass, and DPP connector have been described in Table 1, a description of the ssid, akm, psk, pass, and DPP connector may not be repeated here.

As the first electronic device 1010 transmits the DPP configuration response frame to the third electronic device 1030, the network configuration information managed by the first electronic device 1010 may be updated (or changed) in a form in which information about the third electronic device 1030 which is the newly configured enrollee AP is added. In operation 1040, the first electronic device 1010 may perform a configuration update operation with the second electronic device 1000 which is the configurator.

In an embodiment, the configuration update operation may be performed between configurators (e.g., between the first electronic device 1010 and the second electronic device 1000). In an embodiment, the configuration update operation (or a network configuration information update operation) may include an operation of updating the network configuration information (or an operation of synchronizing the network configuration information). In an embodiment, the configuration update operation may include an operation of exchanging a message indicating that the network configuration information is updated between the configurators (e.g., the first electronic device 1010 and the second electronic device 1000), and an operation of exchanging updated network configuration information. In an embodiment, the message indicating that network configuration information is updated may include update indication information indicating that the network configuration information is updated.

In an embodiment, the message indicating that the network configuration information is updated may be implemented in various formats, and may be implemented in a neighbor awareness networking (NAN) beacon frame or a NAN service discovery frame (SDF), or a Bluetooth low energy (BLE) advertisement (ADV) frame.

In an embodiment, if the message indicating that the network configuration information is updated is implemented in the NAN beacon frame or the NAN SDF, the update indication information indicating that the network configuration information is updated may be implemented in a format of a vendor specific information element (VSIE).

In an embodiment, if the message indicating that the network configuration information is updated is implemented in the BLE ADV frame, the update indication information indicating that the network configuration information is updated may be implemented in a format of a data field included in the BEL ADV frame.

In an embodiment, the configuration update operation may be performed periodically. If the configuration update operation is periodically performed, for example, a plurality of configurators (e.g., the first electronic device 1010 and the second electronic device 1000) may perform the configuration update operation based on the same period.

If the configuration update operation is periodically performed, for another example, each of the plurality of configurators (e.g., the first electronic device 1010 and the second electronic device 1000) may perform the configuration update operation based on an independent period which is set based on a device characteristic of each of the plurality of configurators. For example, a constant power supply may perform a configuration update operation frequently by setting a period of the configuration update operation to be relatively short. For another example, a device in which a consumed current is important may minimize and/or reduce a current consumed in a configuration update operation by setting a period of the configuration update operation to be as long as possible.

In an embodiment, the configuration update operation may be performed in various ways, for example, may be performed based on a NAN standard, a DPP standard, or an OOB mechanism, for example, a BLE standard. A configuration update operation performed based on the NAN standard, the DPP standard, or the BLE standard will be described in greater detail below with reference to the drawings.

If the configuration update operation between the first electronic device 1010 and the second electronic device 1000 is completed, the second electronic device 1000 may update network configuration information based on the network configuration information updated in the first electronic device 1010. As the network configuration information is updated, the network configuration information of the second electronic device 1000 may include information about the third electronic device 1030 which is newly configured by the first electronic device 1010.

After updating the network configuration information, the second electronic device 1000 may perform a DPP provisioning process with the fourth electronic device 1050 which is a new enrollee. The DPP provisioning process performed between the second electronic device 1000 and the fourth electronic device 1050 will be described below.

In operation 1051, the second electronic device 1000 may perform a DPP boost trapping operation with the fourth electronic device 1050. A DPP boost trapping operation (e.g., operation 1051) performed between a configurator and an enrollee has been described in FIG. 7 (e.g., operations 711 to 717) and FIG. 11 (e.g., operations 1111 to 1117), so a description of the DPP bootstrapping operation performed between the second electronic device 1000 and the fourth electronic device 1050 may not be repeated here.

In operation 1053, the second electronic device 1000 may perform a DPP authentication operation with the fourth electronic device 1050. A DPP authentication operation (e.g., operation 1053) performed between a configurator and an enrollee has been described in FIG. 7 (e.g., operations 719 to 731) and FIG. 11 (e.g., operations 1119 to 1131), a description of the DPP authentication operation performed between the second electronic device 1000 and the fourth electronic device 1050 may not be repeated here.

In operation 1055, the fourth electronic device 1050 may transmit a DPP configuration request frame to the second electronic device 1000. In an embodiment, the fourth electronic device 1050 may be selected to operate as an enrollee STA, and may include network role information indicating the enrollee STA into the DPP configuration request frame based on that the fourth electronic device 1050 is selected to operate as the enrollee STA. In an embodiment, the fourth electronic device 1050 may want to connect to an enrollee AP while operating as the enrollee STA. In an embodiment, network role information may be implemented through a netRole parameter, and if a parameter value of the netRole parameter is set to "sta", it may indicate that a network role of the fourth electronic device 1050 may the enrollee STA. Remaining parameters included in the DPP configuration request frame except for the network role information have been described in FIG. 7 (e.g., operation 733) and FIG. 11 (e.g., operation 1133), a description of the remaining parameters included in the DPP configuration request frame except for the network role information may not be repeated here.

In operation 1057, the second electronic device 1000 receiving the DPP configuration request frame may identify that the fourth electronic device 1050 requests to operate as the enrollee STA based on the netRole parameter included in the DPP configuration request frame. The second electronic device 1000 may transmit, to the fourth electronic device 1050, a DPP configuration response frame which is a response to the DPP configuration request frame. In an embodiment, the DPP configuration response frame may include ssid and akm. In an embodiment, the DPP configuration response frame may include psk, pass, and a DPP connector if necessary. The ssid, akm, psk, pass, and DPP connector have been described in Table 1, a description of the ssid, akm, psk, pass, and DPP connector may not be repeated here.

The network configuration information, for example, a DPP configuration object, included in the DPP configuration response frame transmitted from the second electronic device 1000 to the fourth electronic device 1050 in operation 1057 is the same as the network configuration information of the first electronic device 1010, so the network configuration information may also include information about the third electronic device 1030 operating as the enrollee AP. Upon receiving the DPP configuration response frame, the fourth electronic device 1050 may perform a connection operation with the third electronic device 1030 based on the network configuration information included in the DPP configuration response frame in operation 1060.

In an embodiment, if the akm included in the received DPP configuration response frame indicates "dpp", the fourth electronic device 1050 may perform a network access operation as described in FIG. 8 thereby being connected to the third electronic device 1030. In an embodiment, if the akm included in the received DPP configuration response frame does not indicate "dpp", the fourth electronic device 1050 may perform a general Wi-Fi connection operation, e.g., a 4way-handshake operation using credential information, e.g., the psk and pass included in the DPP configuration response frame thereby being connected to the third electronic device 1030.

In an embodiment, if a configuration update operation is triggered according to a update on network configuration information according to a change in existing information such as a case that information about an existing enrollee is changed, not according to a update on the network configuration information according to addition of new information such as a case that information about a newly configured enrollee is added, an enrollee which has performed a DPP provisioning process based on the existing information may perform a DPP reconfiguration operation.

In an embodiment, the DPP reconfiguration operation is an operation in which an already configured enrollee updates network configuration information through a configurator, and the enrollee and the configurator are already connected, so a DPP bootstrapping operation does not need to be performed between the enrollee and the configurator, and only a DPP reconfiguration authentication operation and a DPP configuration operation may be performed.

Figure 12:
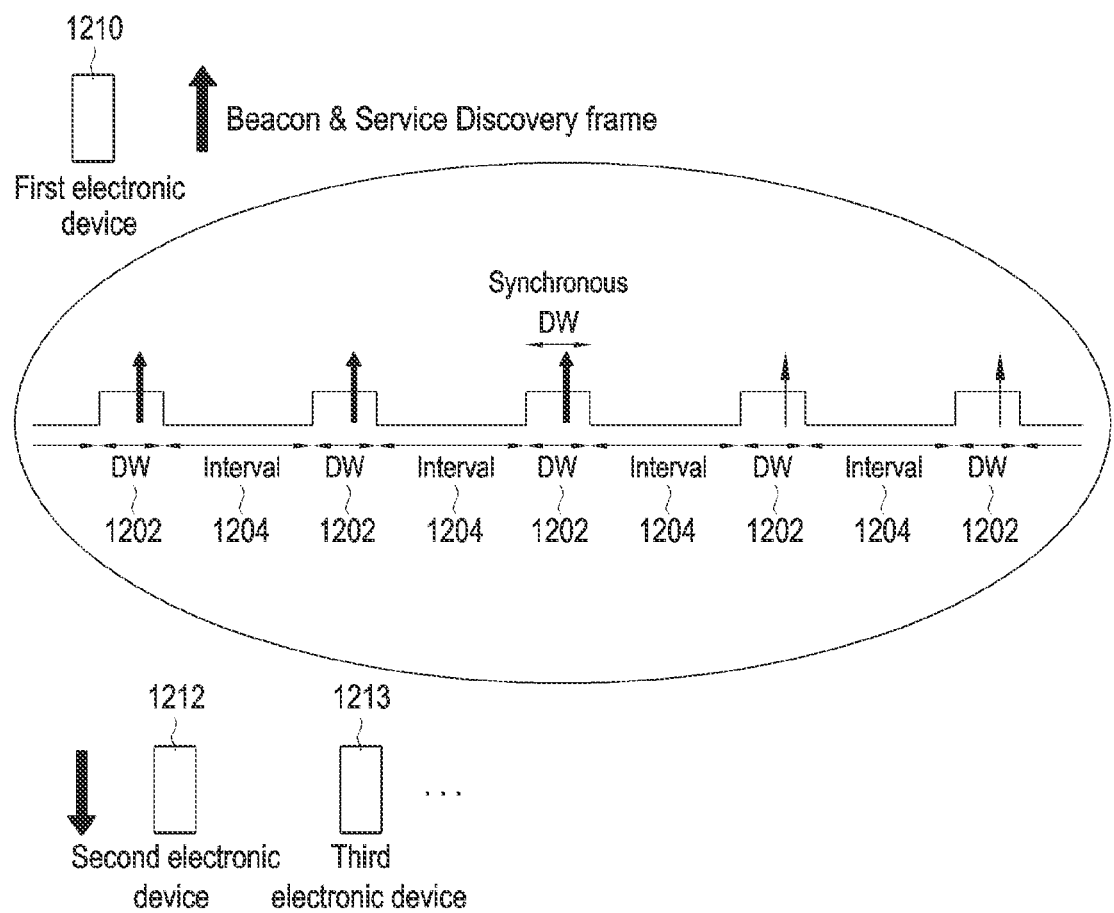
FIG. 12 is a diagram illustrating an example neighbor recognition operation according to various embodiments.

FIG. 12 is a diagram illustrating an example neighbor recognition operation according to various embodiments.

In an embodiment, a neighbor recognition operation described with reference to FIG. 12 may be included in a configuration update operation in operation 1040 in FIG. 10.

Referring to FIG. 12, an electronic device (e.g., an electronic device 101 in FIG. 1), for example, a first electronic device 1210 in a NAN cluster may activate a discovery window (DW) 1202 at time which is promised by a synchronized time clock within the NAN cluster, and transmit a synchronization beacon frame and an SDF within the DW 1202. The NAN cluster may refer, for example, to a collection of NAN devices which share a set of NAN parameters and are synchronized to the same DW schedule. In an embodiment, a NAN device may be an electronic device implementing a NAN protocol. An external electronic device (e.g., an electronic device 102 or an electronic device 104 of FIG. 1) located in a vicinity of the first electronic device 1110, for example, a second electronic device 1212 and a third electronic device 1213 may receive the synchronization beacon frame and the SDF transmitted from the first electronic device 1210 to be synchronized with a time clock of the first electronic device 1210, and obtain NAN parameters of the NAN cluster.

Although not shown in FIG. 12, the first electronic device 1210, the second electronic device 1212, and the third electronic device 1213 may exchange various NAN action frames (NAFs) within the DW 1202.

In a NAN network, message exchange may be possible not only within a DW, but also in intervals 1204 between DWs 1202. For example, an electronic device, for example, the first electronic device 1210 may set additional active time slots in the intervals 1204 between the DWs 1202, or may set additional active time slots through negotiation with the second electronic device 1212 or the third electronic device 1213, and may perform an additional communication during the active time slots.

For example, a service discovery function which is not performed during the DWs 1202 may be additionally performed in intervals, e.g., the intervals 1204, between the DWs 1202, and the intervals 1204 may be used for designating an operation for a Wi-Fi direct connection, a mesh connection, an independent basic service set (IBSS) connection, and a WLAN connection, or performing a connection and/or discovery which is based on legacy Wi-Fi.

In an embodiment, in order to support ranging between electronic devices through fine time measurement (FTM), the electronic device, for example, the first electronic device 1210 may establish a session for NAN ranging in the DWs 1202 and define additional time slots within the intervals 1204 which may be used for ranging.

In an embodiment, in the NAN network, a NAN data path (NDP) technology is based on a non-connection, so the NDP technology may enable a data communication with a relatively fast set time, and a flexible data communication with a plurality of electronic devices. In an embodiment, in the NAN network, the first electronic device 1210 may set time slots to be used as a NAN data path for data transmission through the intervals 1204 between the DWs 1202 without a separate connection, and data transmitted through the NAN data path may be encrypted with security.

In an embodiment, it will be assumed that the first electronic device 1210, the second electronic device 1212, and the third electronic device 1213 operate as a configurator. If there is a need for performing a configuration update operation, the first electronic device 1210, the second electronic device 1212, and the third electronic device 1213 which operate as the configurator may perform the configuration update operation using a beacon frame or an SDF in the DWs 1202. According to an embodiment, if the configuration update operation is periodically performed, the first electronic device 1210, the second electronic device 1212, and the third electronic device 1213 may perform the configuration update operation at each DW 1202.

In an embodiment, information, e.g., configuration update indication information (e.g., update indication information), indicating that a configuration update operation is requested, for example, indicating that an update to network configuration information is required (e.g., indicating that the network configuration information is updated) may be included in a beacon frame or an SDF in a format of a VSIE.

In an embodiment, if the configuration update indication information is included in the beacon frame, an example of a format of the beacon frame may be shown in Table 4 below.

TABLE 4

| Attributes | NAN Beacon frames | |
|---|---|---|
| | Synchronization | Discovery |
| Master Indication attribute | YES/M | YES/M |
| Cluster attribute | YES/M | YES/M |
| Service ID List attribute | YES/O | YES/O |
| Subscribe Service ID List attribute | YES/O | YES/O |
| Service Descriptor Attribute | NO | NO |
| NAN Connection Capability attribute | NO | NO |
| WLAN Infrastructure attribute | NO | NO |
| P2P Operation attribute | NO | NO |
| IBSS attribute | NO | NO |
| Mesh attribute | NO | NO |
| Further NAN Service Discovery attribute | NO | NO |
| Further Availability Map attribute | NO | NO |
| Country Code attribute | YES/O | YES/O |
| Ranging attribute | NO | NO |
| Cluster Discovery attribute | NO | NO |
| Service Descriptor Extension attribute | NO | NO |
| Device Capability | YES/O | YES/O |
| NDP attribute | NO | NO |
| NAN Availability | YES/O | YES/O |
| NDC attribute | YES/O | YES/O |
| NDL attribute | NO | NO |
| NDL QoS Attribute | NO | NO |
| Unaligned Schedule attribute | YES/O | YES/O |
| Ranging Information attribute | YES/O | YES/O |
| Ranging Setup attribute | NO | NO |
| FTM Ranging Report attribute | NO | NO |
| Element Container attribute | YES/O | YES/O |
| Extended WLAN Infrastructure attribute | YES/O | YES/O |
| Extended P2P Operation attribute | YES/O | YES/O |
| Extended IBSS attribute | YES/O | YES/O |
| Extended Mesh attribute | YES/O | YES/O |
| Cipher Suite Info attribute | NO | NO |
| Security Context Info attribute | NO | NO |
| Shared-Key Descriptor attribute | NO | NO |
| Public Availability attribute | YES/O | YES/O |
| Vendor Specific attribute | YES/O | YES/O |

In Table 4, Vendor Specific attribute may be an attribute indicating the configuration update indication information, and may be included in the beacon frame in the format of the VSIE.

In an embodiment, the configuration update indication information may be included in the SDF in the format of the VSIE.

In an embodiment, if the configuration update indication information is included in the SDF, an example of the format of the SDF may be shown in Table 5 below.

TABLE 5

NAN SDF frames

| Attributes | Publish Data Required | Publish Ranging Required | Publish Otherwise | Subscribe | Follow-up |
|---|---|---|---|---|---|
| Master Indication attribute | NO | NO | NO | NO | NO |
| Cluster attribute | NO | NO | NO | NO | NO |
| Service ID List attribute | NO | NO | NO | NO | NO |
| Service Descriptor attribute | YES/M | YES/M | YES/M | YES/M | YES/M |
| NAN Connection Capability attribute | YES/O | YES/O | YES/O | YES/O | YES/O |
| WLAN Infrastructure attribute | YES/O | YES/O | YES/O | YES/O | YES/O |
| P2P Operation attribute | YES/O | YES/O | YES/O | YES/O | YES/O |
| IBSS attribute | YES/O | YES/O | YES/O | YES/O | YES/O |
| Mesh attribute | YES/O | YES/O | YES/O | YES/O | YES/O |
| Further NAN Service Discovery attribute | YES/O | YES/O | YES/O | YES/O | YES/O |
| Further Availability Map attribute | YES/O | YES/O | YES/O | YES/O | YES/O |
| Country Code attribute | YES/O | YES/O | YES/O | YES/O | YES/O |
| Ranging attribute | YES/O | YES/O | YES/O | YES/O | YES/O |
| Cluster Discovery attribute | NO | NO | NO | NO | NO |
| Service Descriptor Extension attribute | YES/M | YES/M | YES/O | YES/O | YES/O |
| Device Capability | YES/M | YES/M | YES/O | YES/O | YES/O |
| NDP attribute | NO | NO | NO | NO | NO |
| NAN availability | YES/M | YES/M | YES/O | YES/O | YES/O |
| NDC attribute | YES/O | YES/O | YES/O | YES/O | YES/O |
| NDL Attribute | NO | NO | NO | NO | NO |
| NDL QoS attribute | NO | NO | NO | NO | NO |
| Unaligned Schedule attribute | YES/O | YES/O | YES/O | YES/O | YES/O |
| Ranging Information attribute | NO | YES/M | NO | NO | YES/O |
| Ranging Setup attribute | NO | NO | NO | NO | NO |
| FTM Ranging Report attribute | NO | NO | NO | NO | NO |
| Element Container attribute | YES/O | YES/O | YES/O | YES/O | YES/O |
| Extended WLAN Infrastructure attribute | YES/O | YES/O | YES/O | YES/O | YES/O |
| Extended P2P Operation attribute | YES/O | YES/O | YES/O | YES/O | YES/O |
| Extended IBSS attribute | YES/O | YES/O | YES/O | YES/O | YES/O |
| Extended Mesh attribute | YES/O | YES/O | YES/O | YES/O | YES/O |
| Cipher Suite Info attribute | YES/O | YES/O | YES/O | YES/O | YES/O |
| Security Context Info attribute | YES/O | YES/O | YES/O | YES/O | YES/O |
| Shared-Key Descriptor attribute | NO | NO | NO | NO | NO |
| Public Availability attribute | YES/O | YES/O | YES/O | YES/O | YES/O |
| Vendor Specific attribute | YES/O | YES/O | YES/O | YES/O | YES/O |

In Table 5, Vendor Specific attribute may be an attribute indicating the configuration update indication information, and may be included in the SDF frame in the format of the VSIE.

In Tables 4 and 5, the Vendor Specific attribute may represent the configuration update indication information, for example, indicating that a configuration update operation is requested, for example, indicating that there is a need for update to a DPP configuration object, and the configuration update indication information may include a DPP update attribute as shown in Table 6 below.

TABLE 6

| Field | Size(Octets) | Value(Hex) | Description |
|---|---|---|---|
| Attribute ID | 1 | 0xDD | Identifies the type of Vender Specific attribute as defined |
| Length | 2 | Variable | Length of the following fields in the attribute |
| Service Id | 2 | 0x112 | DPP Configuration update |
| Group Id | 6 | Variable | Identifies the configurator groups. Id based on key pair. |

TABLE 6-continued

| Field | Size(Octets) | Value(Hex) | Description |
|---|---|---|---|
| Update field | 1 | Variable | B0: 0 = no change, 1 = updated<br>B1: 1 = new AP configured<br>B2: 1 = new STA configured<br>B3 . . . B7: Reserved |
| version | 4 | Variable | Version info |
| SSID | 32 | Variable | New configuration's SSID |

In Table 6, an Attribute ID field may be a field used for identifying a type of a corresponding Vendor Specific attribute, a Length field may be a field used for indicating a length of fields following the Length field, a Service ID field may be a field used for indicating a DPP configuration update, a Group Id field may be a field used for identifying configurator groups which are based on a key pair, a "Update field" field may be a field used for indicating whether a DPP configuration is updated, a version field may be a field used for indicating version information, and an SSID field may be a field used for indicating an SSID of a new configuration.

In an embodiment, the "Update field" field may be implemented in, for example, 1 octet, and may be implemented in a form of a bitmap including 8 bits.

In an embodiment, a bit 0 (B0) may indicate whether network configuration information, for example, a DPP configuration object is updated. For example, if a bit value of the bit 0 (B0) is set to "0", it may indicate that the network configuration information is not changed. For example, if the bit value of the bit 0 (B0) is set to "1", it may indicate that the network configuration information is updated. In an embodiment, a bit 1 (B1) may indicate whether a new AP is configured if the network configuration information is updated. For example, if a bit value of the bit 1 (B1) is set to "1", it may indicate that the new AP is configured. In an embodiment, a bit 2 (B2) may indicate whether a new STA is configured if the network configuration information is updated. For example, if a bit value of bit 2 (B2) is set to "1", it may indicate that the new STA is configured.

Figure 13:
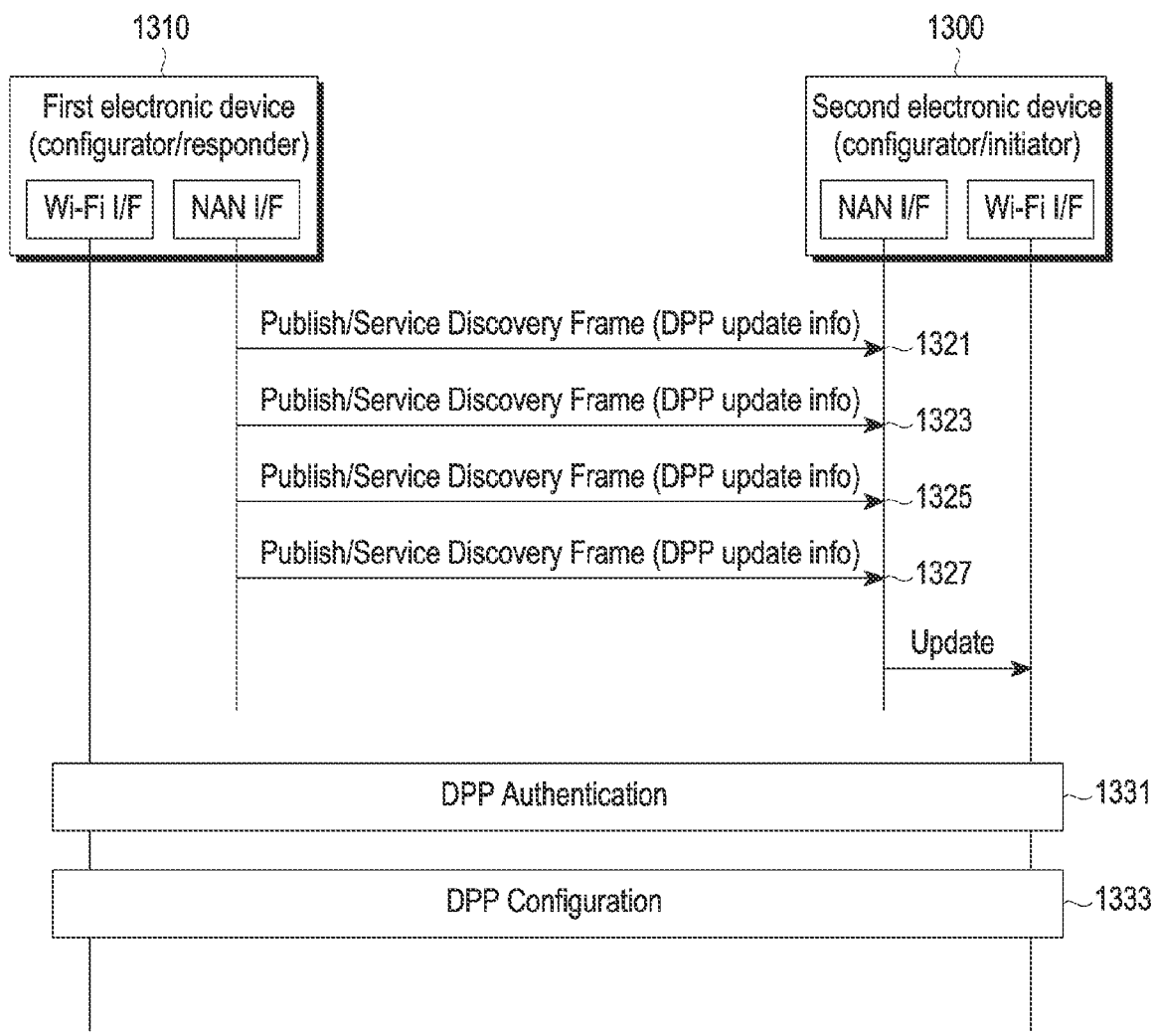
FIG. 13 is a signal flow diagram illustrating an example configuration update operation in a DPP network according to various embodiments.

FIG. 13 is a diagram illustrating an example configuration update operation in a DPP network according to various embodiments.

In an embodiment, a configuration update operation in a DPP network described with reference to FIG. 13 may be included in a configuration update operation in operation 1040 in FIG. 10.

Referring to FIG. 13, it will be assumed that each of an electronic device (e.g., an electronic device 101 in FIG. 1), for example, a first electronic device 1310 and an external electronic device (e.g., an electronic device 102 or an electronic device 104 in FIG. 1), for example, a second electronic device 1300 may be a DPP device, the first electronic device 1310 operates as both a configurator and a responder, and the second electronic device 1300 operates as both a configurator and an initiator. In an embodiment, each of the first electronic device 1310 and the second electronic device 1300 may include a Wi-Fi interface (Wi-Fi I/F) and a NAN interface (NAN I/F).

A configuration update operation between the first electronic device 1310 and the second electronic device 1300 may be performed if an event that requires updating network configuration information occurs. In an embodiment, the event that requires updating the network configuration information may include a case that network configuration information managed by a configurator is changed. In an embodiment, the case that the network configuration information is changed may include, for example, a case that configuration information for an AP having a new SSID is added, or a case that an SSID/AKM is changed.

According to an embodiment, it may not be guaranteed that the configuration update operation between the first electronic device 1310 and the second electronic device 1300 is always successfully performed. For example, this is because a communication between the first electronic device 1310 and the second electronic device 1300 may be impossible if at least one of the first electronic device 1310 and the second electronic device 1300 is a movable device such as a mobile device. According to an embodiment, the event which requires updating the network configuration information may include a case that a location of a configurator is changed. In an embodiment, the change in the location of the configurator may be detected based on at least one of at least one sensor or a global positioning system (GPS) included in each of electronic devices, e.g., the first electronic device 1310 and the second electronic device 1300, which operate as the configurator. In an embodiment, the change in the location of the configurator may be detected while an electronic device which does not operate as a configurator performs a discovering operation based on an OOB mechanism.

The first electronic device 1310 and the second electronic device 1300 may be electronic devices within a NAN cluster, and may perform a configuration update operation in a DW using a beacon frame or an SDF. A format of the beacon frame or the SDF in which configuration update indication information is included has been described in Tables 4 to 6, a description of the format of the beacon frame or the SDF in which the configuration update indication information is included may not be repeated here.

In FIG. 13, it will be assumed that the event which requires updating the network configuration information occurs in the first electronic device 1310. In operation 1321, the first electronic device 1310 may identify that the event which requires updating the network configuration information occurs, and transmit configuration update indication information to the second electronic device 1300 using the SDF. According to an embodiment, the beacon frame or the SDF including the configuration update indication information may be a network configuration information update indication message. In an embodiment, the first electronic device 1310 may periodically transmit the SDF including the configuration update indication information in operations 1323, 1325, and 1327. Upon receiving the beacon frame or the SDF including the configuration update indication information, the second electronic device 1300 may identify that network configuration information of the first electronic device 1310 is updated based on the configuration update indication information.

The first electronic device 1310 may perform a DPP authentication operation (e.g., operation 1331) and a DPP configuration operation (e.g., operation 1333) to provide the second electronic device 1300 with updated network configuration information. In an embodiment, the first electronic device 1310 may perform the DPP authentication operation (e.g., operation 1331) and the DPP configuration operation (e.g., operation 1333) with the second electronic device 1300 as in a configurator delegation operation to provide the second electronic device 1300 with the updated network configuration information. An operation of transmitting/receiving updated network configuration information between configurators will be described in greater detail below with reference to FIG. 16, so a description of the DPP authentication operation (e.g., operation 1331) and the DPP configuration operation (e.g., operation 1333) which the first electronic device 1310 performs to provide the second electronic device 1300 with the updated network configuration information will not be provided here.

According to an embodiment, a configuration update operation may be performed based on an OOB mechanism. A communication scheme used for the OOB mechanism may include various schemes such as a QR code scheme, a Bluetooth scheme, a BLE scheme, or an NFC scheme.

Figure 14:
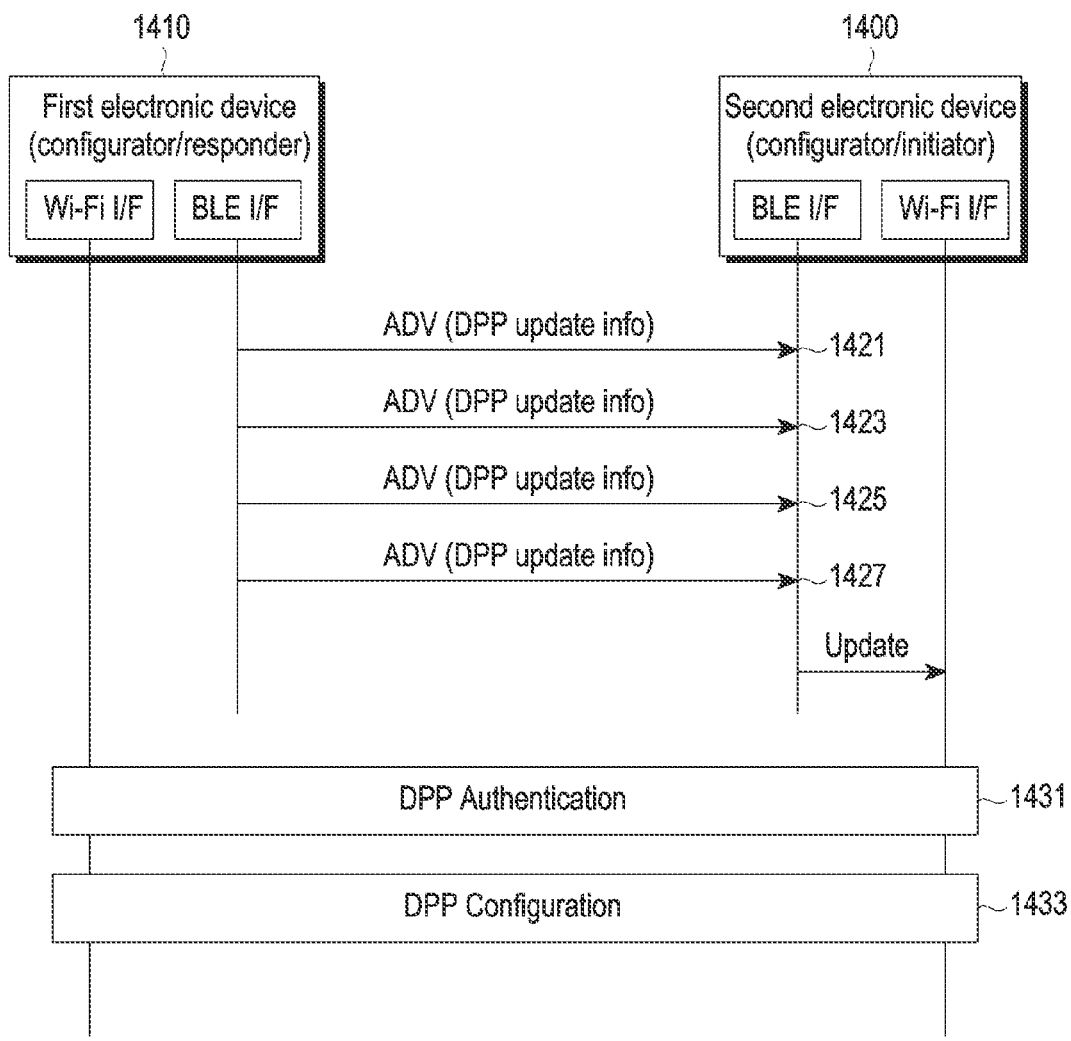
FIG. 14 is a signal flow diagram illustrating an example configuration update operation in a DPP network according to various embodiments.

FIG. 14 is a diagram illustrating an example configuration update operation in a DPP network according to various embodiments.

In an embodiment, a configuration update operation in a DPP network described with reference to FIG. 14 may be included in a configuration update operation in operation 1040 in FIG. 10.

Referring to FIG. 14, it will be assumed that each of an electronic device (e.g., an electronic device 101 in FIG. 1), for example, a first electronic device 1410 and an external electronic device (e.g., an electronic device 102 or an electronic device 104 in FIG. 1), for example, a second electronic device 1400 may be a DPP device, the first electronic device 1410 operates as both a configurator and a responder, and the second electronic device 1400 operates as both a configurator and an initiator. In an embodiment, each of the first electronic device 1410 and the second electronic device 1400 may include a Wi-Fi I/F and a BLE I/F. In FIG. 14, it will be assumed that an OOB mechanism used for the configuration update operation is based on a BLE scheme.

A configuration update operation between the first electronic device 1410 and the second electronic device 1400 may be performed if an event that requires updating network configuration information occurs. In an embodiment, the event that requires updating the network configuration information has been described with reference to FIG. 13, a description of the event that requires updating the network configuration information may not be repeated here.

Figure 15:
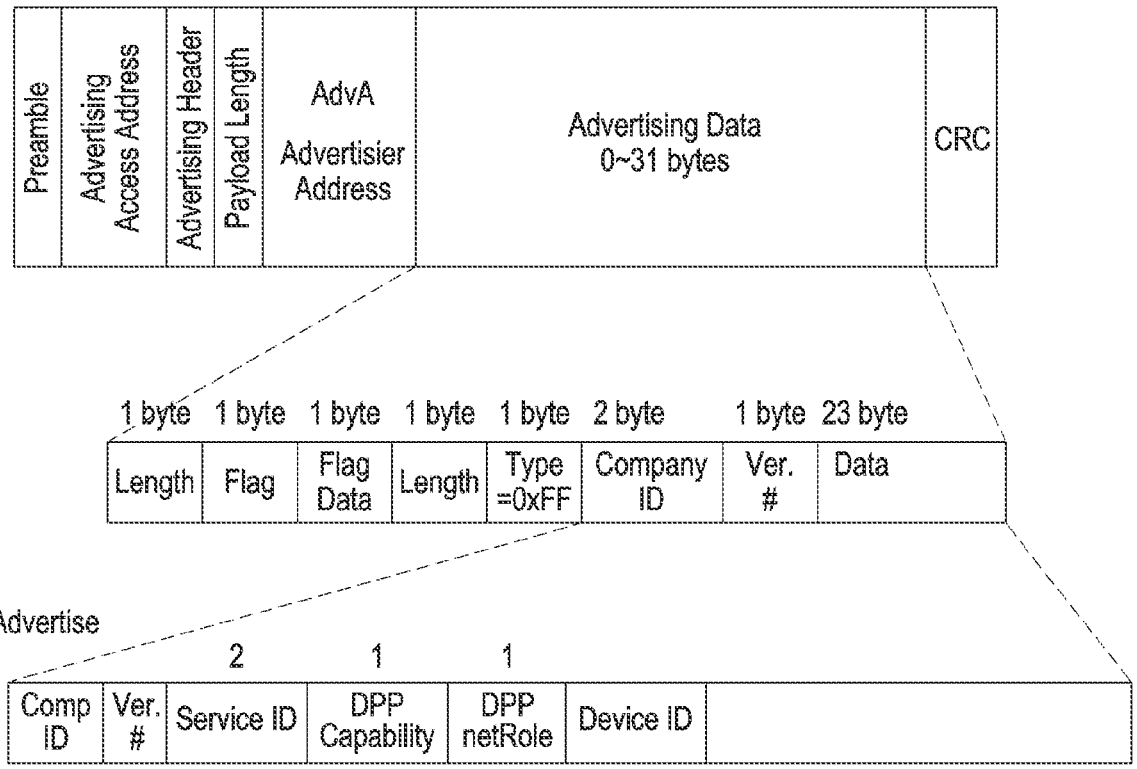
FIG. 15 is a diagram illustrating an example format of a Bluetooth low energy (BLE) advertisement (ADV) frame through which updated network configuration information is transmitted in a DPP network according to various embodiments.

In FIG. 14, it will be assumed that the event which requires updating network configuration information occurs in the first electronic device 1410. In operation 1421, the first electronic device 1410 may identify that the event which requires updating the network configuration information occurs, and transmit configuration update indication information to the second electronic device 1400 through a BLE ADV frame as illustrated in FIG. 15. According to an embodiment, the BLE ADV frame including the configuration update indication information may be a network configuration information update indication message. In an embodiment, the first electronic device 1410 may periodically transmit an ADV frame including the configuration update indication information in operations 1423, 1425, and 1427.

In an embodiment, a data field included in the BLE ADV frame may be represented as shown in Table 7 below.

TABLE 7

| Data Field | DPP Status |
|---|---|
| Service ID | 0x112 = DPP update |
| Group ID | Identifies the configurator groups. |
| Update field | B0: 0 = no change, 1 = updated |
| | B1: 1 = new AP configured |
| | B2: 1 = new STA configured |
| | B3 . . . B7: Reserved |

As shown in Table 7, a Service ID field may be a field used for indicating a DPP configuration update, a Group ID field may be a field used for identifying configurator groups, and a "Update field" field may be a field used for indicating whether a DPP configuration is updated.

In an embodiment, the "Update field" field may be implemented in, for example, 1 octet, and may be implemented in a form of a bitmap including 8 bits.

In an embodiment, a bit 0 (B0) may indicate whether network configuration information, for example, a DPP configuration object is updated. For example, if a bit value of the bit 0 (B0) is set to "0", it may indicate that the network configuration information is not changed. For example, if the bit value of the bit 0 (B0) is set to "1", it may indicate that the network configuration information is updated. In an embodiment, a bit 1 (B1) may indicate whether a new AP is configured if the network configuration information is updated. For example, if a bit value of the bit 1 (B1) is set to "1", it may indicate that the new AP is configured. In an embodiment, a bit 2 (B2) may indicate whether a new STA is configured if the network configuration information is updated. For example, if a bit value of bit 2 (B2) is set to "1", it may indicate that the new STA is configured.

Upon receiving the ADV frame including the configuration update indication information, the second electronic device 1400 may identify that the network configuration information of the first electronic device 1410 is updated based on the configuration update indication information.

The first electronic device 1410 may perform a DPP authentication operation (e.g., operation 1431) and a DPP configuration operation (e.g., operation 1433) to provide the second electronic device 1400 with the updated network configuration information. In an embodiment, the first electronic device 1410 may perform the DPP authentication operation (e.g., operation 1431) and the DPP configuration operation (e.g., operation 1433) with the second electronic device 1400 as in a configurator delegation operation to provide the second electronic device 1400 with the updated network configuration information. An operation of transmitting/receiving updated network configuration information between configurators will be described in greater detail below with reference to FIG. 16, so a description of the DPP authentication operation (e.g., operation 1431) and the DPP configuration operation (e.g., operation 1433) which the first electronic device 1410 performs to provide the second electronic device 1400 with the updated network configuration information will not be provided here.

According to various embodiments, configuration update indication information may be transmitted in a format of a VSIE of a NAN standard through a beacon frame or an SDF, or may be transmitted through an ADV frame of a BLE standard.

In an embodiment, the configuration update indication information may include simplified information of updated network configuration information, e.g., an updated DPP configuration object. In an embodiment, simplified information of network configuration information may be an SSID list. The SSID list may include all SSIDs included in updated network configuration information, or may include an SSID of an actually updated configuration, e.g., an SSID of at least one new configuration or an SSID of at least one changed configuration. If the configuration update indication information is transmitted in the format of the VSIE of the NAN standard through the beacon frame or the SDF, the SSID list may be included in a DPP update attribute as described in Table 6.

A configurator receiving the configuration update indication information may identify the simplified information included in the configuration update indication information, and identify whether network configuration information corresponding to the SSIDs included in the SSID list included in the simplified information has already been updated. If the network configuration information corresponding to the SSIDs included in the SSID list has already been updated, the configurator may not perform an unnecessary configuration update operation, for example, an operation of updating network configuration information.

In an embodiment, configurators may manage a version of network configuration information. For example, if a multi-configurator environment is initially configured, an existing configurator may assign a version to network configuration information provided to a new configurator. Thereafter, whenever the network configuration information is updated, the version of the network configuration information may be increased. In an embodiment, configuration update indication information may include version information indicating a version of network configuration information. If the configuration update indication information is transmitted in a format of a VSIE of a NAN standard through a beacon frame or an SDF, the version information may be included in a DPP update attribute as described in Table 6.

A configurator receiving the configuration update indication information may identify the version information included in the configuration update indication information, and if the version information is the same as version information of network configuration information managed by the configurator itself, the network configuration information has been already updated, the configurator may not perform an unnecessary configuration update operation, for example, an operation for updating network configuration information.

Figure 16:
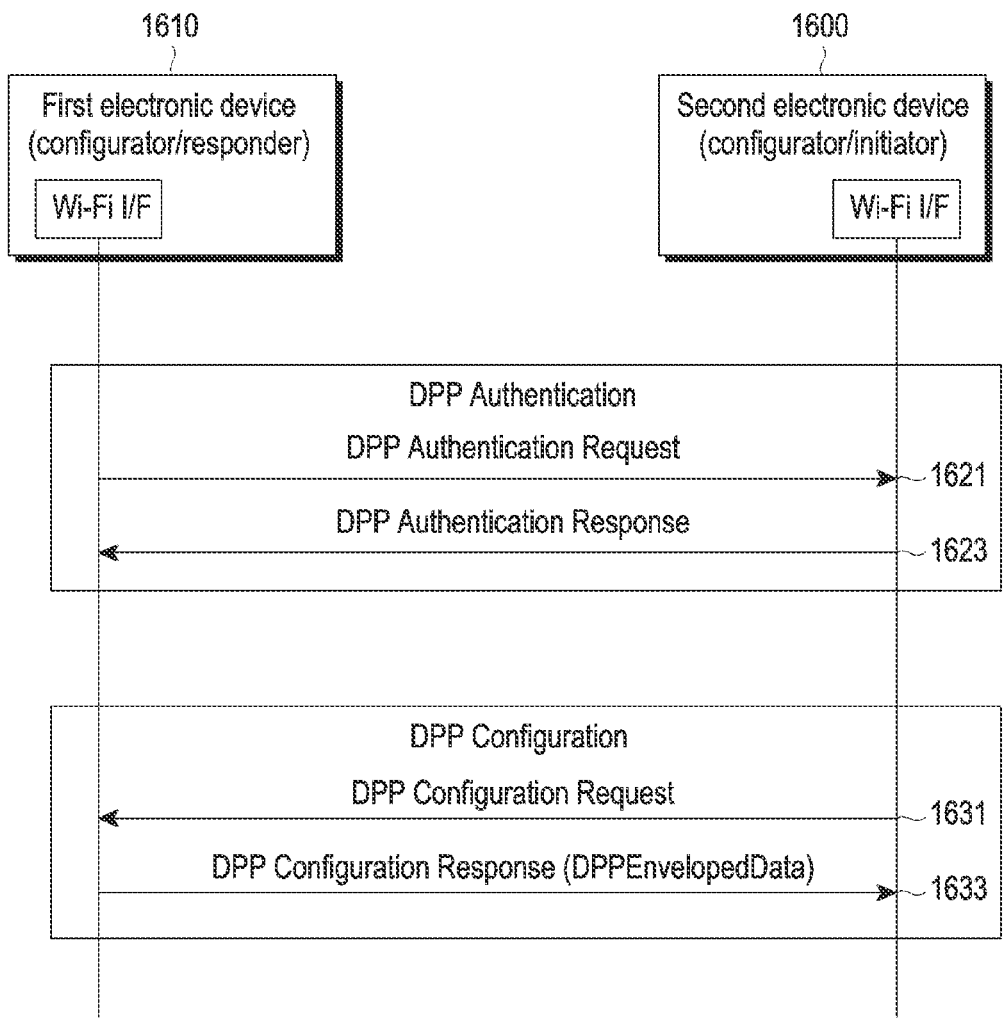
FIG. 16 is a signal flow diagram illustrating an example configuration update operation in a DPP network according to various embodiments.

FIG. 16 is a signal flow diagram illustrating an example configuration update operation in a DPP network according to various embodiments.

In an embodiment, a configuration update operation in a DPP network described with reference to FIG. 16 may be included in a configuration update operation in operation 1040 in FIG. 10.

Referring to FIG. 16, each of an electronic device (e.g., an electronic device 101 in FIG. 1), for example, a first electronic device 1610 and an external electronic device (e.g., an electronic device 102 or an electronic device 104 in FIG. 1), for example, a second electronic device 1600 may be a DPP device, and it will be assumed that the first electronic device 1610 operates as both a configurator and an initiator, and the second electronic device 1600 operates as both a configurator and an enrollee. In an embodiment, each of the first electronic device 1610 and the second electronic device 1600 may include a Wi-Fi I/F.

A configuration update operation between the first electronic device 1610 and the second electronic device 1600 may be performed if an event which requires updating network configuration information occurs. In an embodiment, the event which requires updating the network configuration information has been described with reference to FIG. 13, a description of the event which requires updating the network configuration information may not be repeated here.

In FIG. 16, it will be assumed that the event which requires updating the network configuration information occurs in the first electronic device 1610, and the configuration update operation illustrated in FIG. 16 may be an operation after the first electronic device 1610 transmits configuration update indication information to the second electronic device 1610 thereby the second electronic device 1600 identifies that network configuration information of the first electronic device 1610 has been updated. In an embodiment, an operation of exchanging configuration update indication information in configurators has been described in FIG. 13 (e.g., operations 1321, 1323, 1325, and 1327) and FIG. 14 (e.g., operations 1421, 1423, 1425, and 1427), so a description of an operation of exchanging the configuration update indication information between the first electronic device 1610 and the second electronic device 1600 may not be repeated here.

In operation 1621, the first electronic device 1610 may transmit a DPP authentication request frame to the second electronic device 1600 to update the network configuration information. The second electronic device 1600 may receive the DPP authentication request frame from the first electronic device 1610 and transmit a DPP authentication response frame to the first electronic device 1610 in response to the DPP authentication request frame in operation 1623.

Because the second electronic device 1600 has identified that the network configuration information of the first electronic device 1610 has been updated, the second electronic device 1600 may transmit, to the first electronic device 1600, a DPP configuration request frame to obtain the updated network configuration information of the first electronic device 1610. Upon receiving the DPP configuration request frame from the second electronic device 1600 in operation 1631, the first electronic device 1610 may transmit the updated network configuration information to the second electronic device 1600 in operation 1633. As described in operation 1135 in FIG. 11, the first electronic device 1610 may encrypt network configuration information, for example, a DPP configuration object, which the first electronic device 1610 manages, based on a set encryption scheme to generate encrypted DPP configuration information, and generate DPPEnvelopedData including the encrypted DPP configuration information and the encryption scheme. In an embodiment, the encryption scheme may be a scheme based on an encryption key. The first electronic device 1610 may include the DPPEnvelopedData into a payload of a DPP configuration response frame which is a response frame to the DPP configuration request frame, and transmit the DPP configuration response frame including the DPPEnvelopedData to the second electronic device 1600. In an embodiment, the DPP configuration object may be network configuration information, and may include at least one of a Wi-Fi technology object, a DPP discovery object, or a credential object, and the DPP discovery object may include, for example, operating or discovery information such as an SSID, an operating channel, or an operating band, and/or the like. In an embodiment, the DPP configuration response frame may include a DPP status field and {E-nonce, DPPEnvelopedData}$_{ke}$. In an embodiment, {E-nonce, DPPEnvelopedData}$_{ke}$ may represent E-nonce and DPPEnvelopedData which are encrypted with the key.

Upon receiving the DPP configuration response frame, the second electronic device 1600 may identify the updated network configuration information managed by the first electronic device 1610 based on the DPPEnvelopedData included in the DPP configuration response frame, and thus the second electronic device 1600 may share the same network configuration information with the first electronic device 1610.

In FIG. 16, a case that the first electronic device 1610 which is the configurator transmitting the updated network configuration information operates as the initiator has been described, however, the first electronic device 1610 may also operate as a responder, not the initiator. In an embodiment, if the first electronic device 1610 operates as the responder, the first electronic device 1610 may broadcast a message including information indicating that there is the updated network configuration information through a response waiting channel of another configurator, e.g., the second electronic device 1600. The second electronic device 1600 may receive the broadcast message to identify that there is the updated network configuration information. Because the second electronic device 1600 has identified that the network configuration information of the first electronic device 1610 has been updated, the second electronic device 1600 may obtain the updated network configuration information from the first electronic device 1610. An operation in which the second electronic device 1600 obtains the updated network configuration information from the first electronic device 1610 has been described in operations 1631 and 1633, so a description of the operation in which the second electronic device 1600 obtains the updated network configuration information from the first electronic device 1610 may not be repeated here.

In an embodiment, if the first electronic device 1610 operates as the responder, the first electronic device 1610 may unicast a message including information indicating that there is the updated network configuration information to another configurator, e.g., the second electronic device 1600. In an embodiment, the first electronic device 1610 may need to have already known information about the second electronic device 1600 in order to transmit the message including the information indicating that there is the updated network configuration information in a unicast form. The second electronic device 1600 may receive the unicast message to identify that there is the updated network configuration information. Because the second electronic device 1600 has identified that the network configuration information of the first electronic device 1610 has been updated, the second electronic device 1600 may obtain the updated network configuration information from the first electronic device 1610. An operation in which the second electronic device 1600 obtains the updated network configuration information from the first electronic device 1610 has been described in operations 1631 and 1633, a description of the operation in which the second electronic device 1600 obtains the updated network configuration information from the first electronic device 1610 may not be repeated here.

Figure 17:
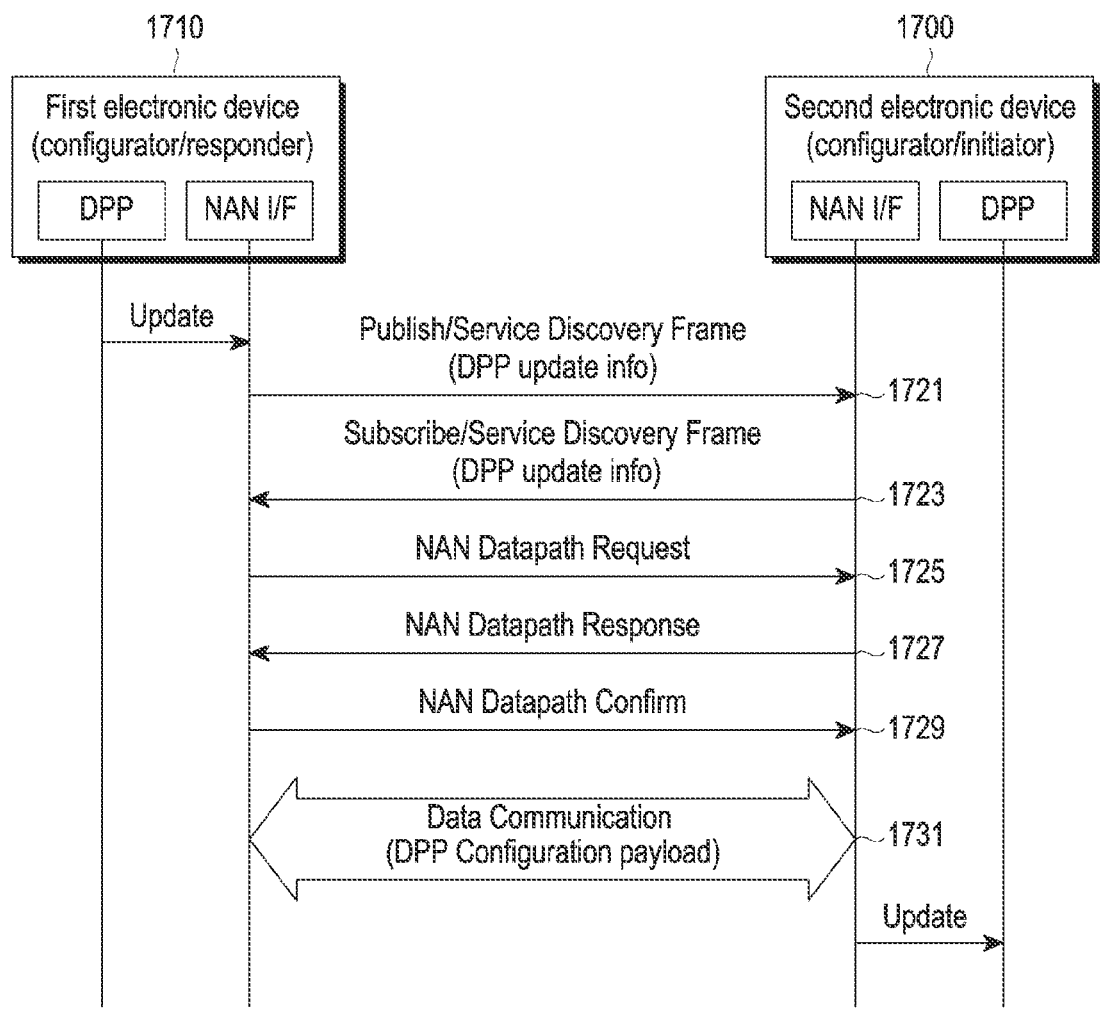
FIG. 17 is a signal flow diagram illustrating an example configuration update operation in a DPP network according to various embodiments.

FIG. 17 is a signal flow diagram illustrating an example configuration update operation in a DPP network according to various embodiments.

In an embodiment, a configuration update operation in a DPP network described with reference to FIG. 17 may be included in a configuration update operation in operation 1040 in FIG. 10.

Referring to FIG. 17, it will be assumed that each of an electronic device (e.g., an electronic device 101 in FIG. 1), for example, a first electronic device 1710 and an external electronic device (e.g., an electronic device 102 or an electronic device 104 in FIG. 1), for example, a second electronic device 1700 may be a DPP device, and the first electronic device 1710 and the second electronic device 1700 operate as a configurator. In an embodiment, each of the first electronic device 1710 and the second electronic device 1700 may include a NAN I/F.

A configuration update operation between the first electronic device 1710 and the second electronic device 1700 may be performed if an event which requires updating network configuration information occurs. In an embodiment, the event which requires updating the network configuration information has been described with reference to FIG. 13, a description of the event which requires updating the network configuration information may not be repeated here.

In operation 1721, the first electronic device 1710 may identify that the event which requires updating the network configuration information occurs, and transmit, to the second electronic device 1700, configuration update indication information using an SDF. According to an embodiment, the SDF including the configuration update indication information may be a network configuration information update indication message. Upon receiving the SDF including the configuration update indication information, the second electronic device 1700 may identify that the network configuration information of the first electronic device 1710 is updated based on the configuration update indication information.

In operation 1723, the second electronic device 1700 may transmit a subscription message to the first electronic device 1710 through an SDF. Upon receiving the subscription message from the second electronic device 1700, the first electronic device 1710 may transmit a NAN data path request message to set up a NAN datapath with the second electronic device 1700 in operation 1725. Upon receiving the NAN datapath request message from the first electronic device 1710, the second electronic device 1700 may transmit, to the first electronic device 1710, a NAN datapath response message which is a response message to the NAN datapath request message in operation 1727. Upon receiving the NAN datapath response message from the second electronic device 1700, the first electronic device 1710 may transmit a NAN datapath confirm message to the second electronic device 1700 in operation 1729.

If the NAN data path is established between the first electronic device 1710 and the second electronic device 1700, a data communication may be performed between the first electronic device 1710 and the second electronic device 1700 through the established NAN data path. In operation 1731, the first electronic device 1710 may transmit updated network configuration information to the second electronic device 1700 through the NAN data path. As described in operation 1135 in FIG. 11, the first electronic device 1710 may encrypt updated network configuration information, for example, a DPP configuration object, which the first electronic device 1710 manages based on a set encryption scheme to generate encrypted DPP configuration information, and generate DPPEnvelopedData including the encrypted DPP configuration information and the encryption scheme. In an embodiment, the encryption scheme may be a scheme based on an encryption key. The first electronic device 1710 may include the DPPEnvelopedData into a payload of a DPP configuration response frame, and transmit the DPP configuration response frame including the DPPEnvelopedData to the second electronic device 1700. In an embodiment, the DPP configuration object may be network configuration information, and may include at least one of a Wi-Fi technology object, a DPP discovery object, or a credential object, and the DPP discovery object may include, for example, operating or discovery information such as an SSID, an operating channel, or an operating band, and/or the like. In an embodiment, the DPP configuration response frame may include a DPP status field and {E-nonce, DPPEnvelopedData}$_{ke}$ In an embodiment, {E-nonce, DPPEnvelopedData}$_{ke}$ may represent E-nonce and DPPEnvelopedData which are encrypted with the key.

Upon receiving the DPP configuration response frame, the second electronic device 1700 may identify the updated network configuration information managed by the first electronic device 1710 based on the DPPEnvelopedData included in the DPP configuration response frame, and thus the second electronic device 1700 may share the same network configuration information with the first electronic device 1710.

In an embodiment, the updated network configuration information may include an SSID required for a network configuration. The updated network configuration information may further include a pre-shared key (PSK) or password for connecting to a network according to AKM.

In an embodiment, the updated network configuration information may include information about newly added enrollee STA and information about an enrollee AP mapped to the newly added enrollee STA. The information about the newly added enrollee STA may include, for example, at least one of a device name, a device ID (or device id), or a MAC address (or mac address). An example of the updated network configuration information has been described in Table 1, and a description of a DPP configuration object will not be included here.

In an embodiment, if at least two electronic devices (e.g., a first electronic device and a second electronic device) operate as configurators, and the first electronic device and the second electronic device update network configuration information, a collision may occur. For example, as each of the first electronic device and the second electronic device updates network configuration information, each of the first electronic device and the second electronic device may perform a configuration update operation. If an SSID included in the updated network configuration information of the first electronic device is identical to an SSID included in the updated network configuration information of the second electronic device, but AKM included in the updated network configuration information of the first electronic device is different from AKM included in the updated network configuration information of the second electronic device, a collision may occur.

A third electronic device which receives the updated network configuration information from all of the first electronic device and the second electronic device may determine to need to process which one of the updated network configuration information of the first electronic device and the updated network configuration information of the second electronic device as updated network configuration information. According to an embodiment, the third electronic device may operate as a configurator.

In an embodiment, updated network configuration information may include time information. The time information may indicate time at which the updated network configuration information is generated. The third electronic device may identify updated network configuration information which is generated later based on time information included in the updated network configuration information of the first electronic device and time information included in the updated network configuration information of the second electronic device information. Based on the time information, the third electronic device may obtain the latest updated network configuration information.

In an embodiment, if the third electronic device stores a delegation relationship between the first electronic device and the second electronic device, the third electronic device may determine to need to process which one of the updated network configuration information of the first electronic device and the updated network configuration information of the second electronic device as the updated network configuration information based on the delegation relationship between the first electronic device and the second electronic device. A delegation relationship may indicate a parent configurator and a child configurator used in a configurator delegation operation, the parent configurator may be an existing configurator, e.g., a configurator providing network configuration information, and the child configurator may be a new configurator, e.g., a configurator receiving the network configuration information. In an embodiment, it will be assumed that the first electronic device is the parent configurator and the second electronic device is the child configurator. Based on the delegation relationship, the third electronic device may process the updated network configuration information provided by the first electronic device as the network configuration information of the third electronic device.

According to various example embodiments of the disclosure, a method for managing network configuration information in an electronic device (an electronic device 101 in FIG. 1 or a first electronic device 1010 in FIG. 10) may comprise: receiving, from an external electronic device (an electronic device 102 or an electronic device 104 in FIG. 1 or a second electronic device 1000 in FIG. 10), a message requesting network configuration information including network role information set to a configurator, transmitting, to the external electronic device (the electronic device 102 or the electronic device 104 in FIG. 1 or the second electronic device 1000 in FIG. 10), a message including network configuration information of the electronic device (the electronic device 101 in FIG. 1 or the first electronic device 1010 in FIG. 10), updating the network configuration information, transmitting, to the external electronic device (the electronic device 102 or the electronic device 104 in FIG. 1 or the second electronic device 1000 in FIG. 10), a message indicating that the network configuration information is updated, and transmitting, to the external electronic device (the electronic device 102 or the electronic device 104 in FIG. 1 or the second electronic device 1000 in FIG. 10), a message including updated network configuration information.

According to various example embodiments of the disclosure, transmitting, to the external electronic device (the electronic device 102 or the electronic device 104 in FIG. 1 or the second electronic device 1000 in FIG. 10), the message indicating that the network configuration information is updated may comprise: transmitting, to the external electronic device (the electronic device 102 or the electronic device 104 in FIG. 1 or the second electronic device 1000 in FIG. 10), the message indicating that the network configuration information is updated in a discovery window (DW) synchronized between the electronic device (the electronic device 101 in FIG. 1 or the first electronic device 1010 in FIG. 10) and the external electronic device (the electronic device 102 or the electronic device 104 in FIG. 1 or the second electronic device 1000 in FIG. 10).

According to various example embodiments of the disclosure, the message indicating that the network configuration information is updated may include update indication information indicating that the network configuration information is updated, and the message indicating that the network configuration information is updated may include a neighbor awareness networking (NAN) beacon frame or a NAN service discovery frame (SDF).

According to various example embodiments of the disclosure, the update indication information may include at least one of an update field indicating whether the network configuration information is updated, a service set identifier (SSID) field indicating an SSID of a new configuration, or a version field indicating a version of the updated network configuration information.

According to various example embodiments of the disclosure, the message indicating that the network configuration information is updated may include update indication information indicating that the network configuration information is updated, and the message indicating that the network configuration information is updated may include a Bluetooth low energy (BLE) advertisement (ADV) frame.

According to various example embodiments of the disclosure, the update indication information may include at least one of an update field indicating whether the network configuration information is updated, a service set identifier (SSID) field indicating an SSID of a new configuration, or a version field indicating a version of the updated network configuration information.

According to various example embodiments of the disclosure, transmitting, to the external electronic device (the electronic device 102 or the electronic device 104 in FIG. 1 or the second electronic device 1000 in FIG. 10), the message including the updated network configuration information may comprise: performing an authentication operation between the electronic device (the electronic device 101 in FIG. 1 or the first electronic device 1010 in FIG. 10) and the external electronic device (the electronic device 102 or the electronic device 104 in FIG. 1 or the second electronic device 1000 in FIG. 10) after transmitting the message indicating that the network configuration information is updated, receiving, from the external electronic device (the electronic device 102 or the electronic device 104 in FIG. 1 or the second electronic device 1000 in FIG. 10), the message requesting the network configuration information after performing the authentication operation between the electronic device (the electronic device 101 in FIG. 1 or the first electronic device 1010 in FIG. 10) and the external electronic device (the electronic device 102 or the electronic device 104 in FIG. 1 or the second electronic device 1000 in FIG. 10), and transmitting, to the external electronic device (the electronic device 102 or the electronic device 104 in FIG. 1 or the second electronic device 1000 in FIG. 10), the message including the updated network configuration information.

According to various example embodiments of the disclosure, transmitting, to the external electronic device (the electronic device 102 or the electronic device 104 in FIG. 1 or the second electronic device 1000 in FIG. 10), the message including the updated network configuration information may include: setting up a neighbor awareness networking (NAN) data path between the electronic device (the electronic device 101 in FIG. 1 or the first electronic device 1010 in FIG. 10) and the external electronic device (the electronic device 102 or the electronic device 104 in FIG. 1 or the second electronic device 1000 in FIG. 10) after transmitting the message indicating that the network configuration information is updated, and transmitting, to the external electronic device (the electronic device 102 or the electronic device 104 in FIG. 1 or the second electronic device 1000 in FIG. 10), the message including the updated network configuration information through the set up NAN data path.

According to various example embodiments of the disclosure, a method for managing network configuration information in an electronic device (an electronic device 101 in FIG. 1 or a second electronic device 1000 in FIG. 10) may comprise: transmitting, to an external electronic device (an electronic device 102 or an electronic device 104 in FIG. 1 or a first electronic device 1010 in FIG. 10), a message requesting network configuration information including network role information set to a configurator, receiving, from the external electronic device (the electronic device 102 or the electronic device 104 in FIG. 1 or the first electronic device 1010 in FIG. 10), a message including network configuration information of the external electronic device (the electronic device 102 or the electronic device 104 in FIG. 1 or the first electronic device 1010 in FIG. 10), receiving, from the external electronic device (the electronic device 102 or the electronic device 104 in FIG. 1 or the first electronic device 1010 in FIG. 10), a message indicating that the network configuration information is updated, and receiving, from the external electronic device (the electronic device 102 or the electronic device 104 in FIG. 1 or the first electronic device 1010 in FIG. 10), a message including updated network configuration information.

According to various example embodiments of the disclosure, receiving, from the external electronic device (the electronic device 102 or the electronic device 104 in FIG. 1 or the first electronic device 1010 in FIG. 10), the message indicating that the network configuration information is updated may comprise: receiving, from the external electronic device (the electronic device 102 or the electronic device 104 in FIG. 1 or the first electronic device 1010 in FIG. 10), the message indicating that the network configuration information is updated in a discovery window (DW) synchronized between the electronic device (the electronic device 101 in FIG. 1 or the second electronic device 1000 in FIG. 10) and the external electronic device (the electronic device 102 or the electronic device 104 in FIG. 1 or the first electronic device 1010 in FIG. 10).

According to various example embodiments of the disclosure, the message indicating that the network configuration information is updated may include update indication information indicating that the network configuration information is updated, and the message indicating that the network configuration information is updated may include a neighbor awareness networking (NAN) beacon frame or a NAN service discovery frame (SDF).

According to various example embodiments of the disclosure, the update indication information may include at least one of an update field indicating whether the network configuration information is updated, a service set identifier (SSID) field indicating an SSID of a new configuration, or a version field indicating a version of the updated network configuration information.

According to various example embodiments of the disclosure, the message indicating that the network configuration information is updated may include update indication information indicating that the network configuration information is updated, and the message indicating that the network configuration information is updated may include a Bluetooth low energy (BLE) advertisement (ADV) frame.

According to various example embodiments of the disclosure, the update indication information may include at least one of an update field indicating whether the network configuration information is updated, or a version field indicating a version of the updated network configuration information.

According to various example embodiments of the disclosure, receiving, from the external electronic device (the electronic device 102 or the electronic device 104 in FIG. 1 or the first electronic device 1010 in FIG. 10), the message including the updated network configuration information may comprise: performing an authentication operation between the electronic device (the electronic device 101 in FIG. 1 or the second electronic device 1000 in FIG. 10) and the external electronic device (the electronic device 102 or the electronic device 104 in FIG. 1 or the first electronic device 1010 in FIG. 10) after receiving the message indicating that the network configuration information is updated, transmitting, to the external electronic device (the electronic device 102 or the electronic device 104 in FIG. 1 or the first electronic device 1010 in FIG. 10), the message requesting the network configuration information after performing the authentication operation between the electronic device (the electronic device 101 in FIG. 1 or the second electronic device 1000 in FIG. 10) and the external electronic device (the electronic device 102 or the electronic device 104 in FIG. 1 or the first electronic device 1010 in FIG. 10), and receiving, from the external electronic device (the electronic device 102 or the electronic device 104 in FIG. 1 or the first electronic device 1010 in FIG. 10), the message including the updated network configuration information.

According to various example embodiments of the disclosure, receiving, from the external electronic device (the electronic device 102 or the electronic device 104 in FIG. 1 or the first electronic device 1010 in FIG. 10), the message including the updated network configuration information may comprise: setting up a neighbor awareness networking (NAN) data path between the electronic device (the electronic device 101 in FIG. 1 or the second electronic device 1000 in FIG. 10) and the external electronic device (the electronic device 102 or the electronic device 104 in FIG. 1 or the first electronic device 1010 in FIG. 10) after receiving the message indicating that the network configuration information is updated, and receiving, from the external electronic device (the electronic device 102 or the electronic device 104 in FIG. 1 or the first electronic device 1010 in FIG. 10), the message including the updated network configuration information through the set up NAN data path.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device configured and activated as a first configurator, comprising:
   at least one communication circuit;
   at least one processor; and
   memory storing instructions which, when executed by the at least one processor, cause the electronic device to:
   receive, from an external electronic device through the at least one communication circuit, a message requesting network configuration information including network role information set to a configurator,
   transmit, to the external electronic device through the at least one communication circuit, a configurator delegation message including network configuration information of the electronic device to configure the external electronic device as a second configurator that shares the same network configuration information with the first configurator,
   update the network configuration information,
   transmit, directly to the external electronic device without involving a base station or an access point, a message indicating that the network configuration information is updated while the external electronic device is activated as the second configurator where the electronic device and the external electronic device are configured and synchronized to share network management operations as a configurator, wherein the message indicating that the network configuration information is updated includes a value indicating whether a new access point is configured and a value indicating whether a new station is configured,
   transmit, directly to the external electronic device without involving the base station or the access point, a message including the updated network configuration information, and
   receive, directly from the external electronic device without involving the base station or the access point, a further message including further updated network configuration information related to provisioning of an additional external electronic device by the external electronic device functioning as the second configurator.

2. The electronic device of claim 1, wherein the instructions, when executed by the at least one processor, cause the electronic device to:
   transmit, directly to the external electronic device without involving the base station or the access point, the message indicating that the network configuration information is updated in a discovery window (DW) synchronized between the electronic device and the external electronic device.

3. The electronic device of claim 2, wherein the message indicating that the network configuration information is updated includes update indication information indicating that the network configuration information is updated, and wherein the message indicating that the network configuration information is updated includes a neighbor awareness networking (NAN) beacon frame or a NAN service discovery frame (SDF).

4. The electronic device of claim 3, wherein the update indication information includes at least one of an update field indicating whether the network configuration information is updated, a service set identifier (SSID) field indicating an SSID of a new configuration, or a version field indicating a version of the updated network configuration information.

5. The electronic device of claim 1, wherein the instructions, when executed by the at least one processor, cause the electronic device to:
   perform, through the at least one communication circuit, an authentication operation between the electronic device and the external electronic device after transmitting the message indicating that the network configuration information is updated, receive, from the external electronic device, the message requesting the network configuration information after performing the authentication operation between the electronic device and the external electronic device, and transmit, directly to the external electronic device without involving the base station or the access point, the message including the updated network configuration information.

6. The electronic device of claim 1, wherein the instructions, when executed by the at least one processor, cause the electronic device to:

set up, through the at least one communication circuit, a neighbor awareness networking (NAN) data path between the electronic device and the external electronic device after transmitting the message indicating that the network configuration information is updated, and transmit, directly to the external electronic device without involving the base station or the access point, the message including the updated network configuration information through the set up NAN data path.

7. An electronic device, comprising:
at least one communication circuit;
at least one processor; and
memory storing instructions which, when executed by the at least one processor, cause the electronic device to:
transmit, to an external electronic device configured and activated as a first configurator through the at least one communication circuit, a message requesting network configuration information including network role information set to a configurator,
receive, from the external electronic device through the at least one communication circuit,
a configurator delegation message including network configuration information of the external electronic device to configure the electronic device as a second configurator that shares the same network configuration information with the external electronic device,
receive, directly from the external electronic device without involving a base station or an access point, a message indicating that the network configuration information is updated while the e electronic device is activated as the second configurator where the electronic device and the external electronic device are configured and synchronized to share network management operations as a configurator, wherein the message indicating that the network configuration information is updated includes a value indicating whether a new access point is configured and a value indicating whether a new station is configured,
receive, directly from the external electronic device without involving the base station or the access point, a message including updated network configuration information, and
transmit, directly to the external electronic device without involving the base station or the access point, a further message including further updated network configuration information related to provisioning of an additional external electronic device by the electronic device functioning as the second configurator.

8. The electronic device of claim 7, wherein the instructions, when executed by the at least one processor, cause the electronic device to:

receive, directly from the external electronic device without involving the base station or the access point, the message indicating that the network configuration information is updated in a discovery window (DW) synchronized between the electronic device and the external electronic device.

9. The electronic device of claim 8, wherein the message indicating that the network configuration information is updated includes update indication information indicating that the network configuration information is updated, and wherein the message indicating that the network configuration information is updated includes a neighbor awareness networking (NAN) beacon frame or a NAN service discovery frame (SDF).

10. The electronic device of claim 7, wherein the message indicating that the network configuration information is updated includes update indication information indicating that the network configuration information is updated, and wherein the message indicating that the network configuration information is updated includes a Bluetooth low energy (BLE) advertisement (ADV) frame.

11. The electronic device of claim 7, wherein the instructions, when executed by the at least one processor, cause the electronic device to:

perform, through the at least one communication circuit, an authentication operation between the electronic device and the external electronic device after receiving the message indicating that the network configuration information is updated, transmit, to the external electronic device, the message requesting the network configuration information after performing the authentication operation between the electronic device and the external electronic device, and receive, directly from the external electronic device without involving the base station or the access point, the message including the updated network configuration information.

12. The electronic device of claim 7, wherein the instructions, when executed by the at least one processor, cause the electronic device to:

set up, through the at least one communication circuit, a neighbor awareness networking (NAN) data path between the electronic device and the external electronic device after receiving the message indicating that the network configuration information is updated, and receive, directly from the external electronic device without involving the base station or the access point, the message including the updated network configuration information through the set up NAN data path.

13. A method for managing network configuration information in an electronic device configured and activated as a first configurator, the method comprising:

receiving, from an external electronic device, a message requesting network configuration information including network role information set to a configurator;

transmitting, to the external electronic device, a configurator delegation message including network configuration information of the electronic device to configure the external electronic device as a second configurator that shares the same network configuration information with the first configurator;

updating the network configuration information;

transmitting, directly to the external electronic device without involving a base station or an access point, a message indicating that the network configuration information is updated while the external electronic device is activated as the second configurator where the electronic device and the external electronic device are configured and synchronized to share network management operations as a configurator, wherein the message indicating that the network configuration information is updated includes a value indicating whether a new access point is configured and a value indicating whether a new station is configured;

transmitting, directly to the external electronic device without involving the base station or the access point, a message including the updated network configuration information, and receiving, directly from the external electronic device without involving the base station or the access point, a further message including further updated network configuration information related to provisioning of an additional external electronic device by the external electronic device functioning as the second configurator.

14. The method of claim 13, wherein transmitting, directly to the external electronic device without involving the base station or the access point, the message including the updated network configuration information comprises:

performing an authentication operation between the electronic device and the external electronic device after transmitting the message indicating that the network configuration information is updated;

receiving, from the external electronic device, the message requesting the network configuration information after performing the authentication operation between the electronic device and the external electronic device; and transmitting, directly to the external electronic device without involving the base station or the access point, the message including the updated network configuration information.

15. The method of claim 13, wherein transmitting, directly to the external electronic device without involving the base station or the access point, the message including the updated network configuration information comprises:

setting up a neighbor awareness networking (NAN) data path between the electronic device and the external electronic device after transmitting the message indicating that the network configuration information is updated; and transmitting, directly to the external electronic device without involving the base station or the access point, the message including the updated network configuration information through the set up NAN data path.

16. A non-transitory computer-readable storage medium for storing instructions which, when executed by at least one processor of an electronic device, control the electronic device to perform:

receiving, from an external electronic device, a message requesting network configuration information including network role information set to a configurator;

transmitting, to the external electronic device, a configurator delegation message including network configuration information of the electronic device to configure the external electronic device as a second configurator that shares the same network configuration information with the first configurator;

updating the network configuration information;

transmitting, directly to the external electronic device without involving a base station or an access point, a message indicating that the network configuration information is updated while the external electronic device is activated as the second configurator where the electronic device and the external electronic device are configured and synchronized to share network management operations as a configurator, wherein the message indicating that the network configuration information is updated includes a value indicating whether a new access point is configured and a value indicating whether a new station is configured;

transmitting, directly to the external electronic device without involving the base station or the access point, a message including the updated network configuration information, and receiving, directly from the external electronic device without involving the base station or the access point, a further message including further updated network configuration information related to provisioning of an additional external electronic device by the external electronic device functioning as the second configurator.

17. The non-transitory computer-readable storage medium of claim 16, wherein transmitting, directly to the external electronic device without involving the base station or the access point, the message including the updated network configuration information comprises:

performing an authentication operation between the electronic device and the external electronic device after transmitting the message indicating that the network configuration information is updated;

receiving, from the external electronic device, the message requesting the network configuration information after performing the authentication operation between the electronic device and the external electronic device; and transmitting, directly to the external electronic device without involving the base station or the access point, the message including the updated network configuration information.

18. The non-transitory computer-readable storage medium of claim 16, wherein transmitting, directly to the external electronic device without involving the base station or the access point, the message including the updated network configuration information comprises:

setting up a neighbor awareness networking (NAN) data path between the electronic device and the external electronic device after transmitting the message indicating that the network configuration information is updated; and transmitting, directly to the external electronic device without involving the base station or the access point, the message including the updated network configuration information through the set up NAN data path.

* * * * *